United States Patent
Panteleev et al.

(10) Patent No.: US 9,706,591 B2
(45) Date of Patent: Jul. 11, 2017

(54) DEVICE TO-DEVICE (D2D) TRANSMIT BEHAVIOR

(71) Applicant: Intel Corporation, Santa Clara, CA (US)

(72) Inventors: Sergey Panteleev, Nizhny Novgorod (RU); Alexey Khoryaev, Nizhny Novgorod (RU); Debdeep Chatterjee, Mountain View, CA (US); Sergey Sosnin, Zavolzhie (RU)

(73) Assignee: INTEL CORPORATION, Santa Clara, CA (US)

(*) Notice: Subject to any disclaimer, the term of this patent is extended or adjusted under 35 U.S.C. 154(b) by 74 days.

(21) Appl. No.: 14/701,423

(22) Filed: Apr. 30, 2015

(65) Prior Publication Data
US 2016/0128115 A1    May 5, 2016

Related U.S. Application Data

(60) Provisional application No. 62/075,611, filed on Nov. 5, 2014.

(51) Int. Cl.
*H04W 4/00* (2009.01)
*H04W 76/02* (2009.01)
(Continued)

(52) U.S. Cl.
CPC ......... *H04W 76/023* (2013.01); *H04W 8/005* (2013.01); *H04W 72/121* (2013.01); *H04W 76/064* (2013.01)

(58) Field of Classification Search
None
See application file for complete search history.

(56) References Cited

U.S. PATENT DOCUMENTS

| 2013/0188546 A1* | 7/2013 | Turtinen | H04W 8/005 370/312 |
| 2014/0056220 A1* | 2/2014 | Poitau | H04W 40/246 370/328 |

(Continued)

OTHER PUBLICATIONS

International Search Report and Written Opinion for International Application No. PCT/US2015/054092 mailed on Jan. 27, 2016; 15 pages.

(Continued)

*Primary Examiner* — Anh-Vu Ly
(74) *Attorney, Agent, or Firm* — Schwabe, Williamson & Wyatt, P.C.

(57) ABSTRACT

In embodiments, apparatuses, methods, and storage media may be described for mapping media access control (MAC) protocol data units (PDUs) that are used to transmit scheduling assignment (SA) discovery, and/or device-to-device (D2D) data. Embodiments herein may describe how one or more MAC PDUs may be mapped into a time resource pattern for transmissions (T-RPT). Embodiments herein may further describe examples of how and when a UE may skip subframes in transmissions of the SA and/or data. Additionally, embodiments herein may further describe examples of how a UE may behave if the UE cannot transmit one or more scheduled instances of SA or data. Additionally, embodiments herein may describe resolution of collisions of D2D discovery messages in the time domain. Other embodiments may be described and/or claimed.

19 Claims, 12 Drawing Sheets

(51) Int. Cl.
*H04W 72/12* (2009.01)
*H04W 76/06* (2009.01)
*H04W 8/00* (2009.01)

(56) References Cited

U.S. PATENT DOCUMENTS

| | | | | |
|---|---|---|---|---|
| 2015/0043446 A1* | 2/2015 | Tsirtsis | H04W 72/10 | 370/329 |
| 2015/0045050 A1* | 2/2015 | Sartori | H04W 8/005 | 455/452.1 |
| 2015/0098416 A1* | 4/2015 | Kuo | H04W 72/10 | 370/329 |
| 2015/0098422 A1* | 4/2015 | Sartori | H04W 72/1242 | 370/329 |
| 2015/0271810 A1* | 9/2015 | Sartori | H04L 5/14 | 370/280 |
| 2015/0271862 A1* | 9/2015 | Lee | H04W 76/023 | 370/278 |
| 2015/0327201 A1* | 11/2015 | He | H04W 48/16 | 370/336 |
| 2016/0036577 A1* | 2/2016 | Meng | H04L 5/0055 | 370/280 |
| 2016/0044619 A1* | 2/2016 | Ryu | H04W 56/0015 | 370/350 |
| 2016/0044652 A1* | 2/2016 | Xue | H04W 56/001 | 370/329 |
| 2016/0057798 A1* | 2/2016 | Chae | H04B 1/713 | 370/280 |

OTHER PUBLICATIONS

Potevio; "Some Consideration and signalling flows of D2D discovery resource allocation and release," Agenda Item: 7.4.3.1; 3GPP TSG-RAN WG2 meeting #86; R2-142494; Seoul, Republic of Korea, May 19-23, 2014; 5 pages.

LG Electronics; "Multiplexing issues of WAN and D2D," Agenda Item: 6.2.52.2; 3GPP TSG RAN WG1 Meeting #77; R1-142152; Seoul, Korea, May 19-23, 2014; 3 pages.

Intel Corporation; "On remaining details of D2D discovery," Agenda Item: 6.2.1.8; R1-144654; 3GPP TSG RAN VG1 Meeting #79; San Francisco, USA, Nov. 17-21, 2014; 7 pages.

Intel Corporation; "On Overlap of Different Types of D2D Resource Pools," Agenda Item: 6.2.1.4; R1-144677; 3GPP TSG RAN WG1 Meeting #79; San Francisco, USA, Nov. 17-21, 2014; 4 pages.

3GPP TS 36.213 V10.5.0 (Mar. 2012); Technical Specification Group Radio Access Network; Evolved Universal Terrestrial Radio Access (E-UTRA); Physical layer procedures (Release 10); 125 pages.

Office Action issued Mar. 14, 2017 from Taiwan Patent Application No. 104131627, 13 pages.

Huawei et al., "Resource allocation for type-1 and type-2B discovery," 3GPP TSG RAN WG1 Meeting #76bis, R1-141138, Agenda item: 7.2.7.2.1, Mar. 31-Apr. 4, 2014, Shenzhen, China, 5 pages.

* cited by examiner

DEVICE TO-DEVICE (D2D) TRANSMIT BEHAVIOR

CROSS-REFERENCE TO RELATED APPLICATION

This application claims the benefit of U.S. Patent Application No. 62/075,611, filed Nov. 5, 2014, entitled "METHOD FOR D2D INTERFERENCE RANDOMIZATION AND D2D TX BEHAVIOR IN CASE OF COLLISION WITH WAN TRANSMISSIONS," the entire contents of which are herein incorporated in their entirety.

FIELD

Embodiments of the present invention relate generally to the technical field of user equipment (UE) device-to-device (D2D) transmission behavior in wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In device-to-device (D2D) communication, the following two-step transmission of direct data may be used. First, a scheduling assignment (SA) or a physical sidelink control channel (PSCCH) transmission that includes control information may be transmitted from a transmitting user equipment (UE) to a receiving UE. The SA or PSCCH transmission may include control information that the receiving UE may need to receive a data transmission from the transmitting UE. Next, the transmitting UE may transmit data according to the SA or PSCCH control information. In some cases, the UE transmissions of the SA, PSCCH, and/or data may be based on resources allocated by an evolved NodeB (eNB), which is referred to herein as Mode-1 operation. In other cases, the transmissions of the SA, PSCCH, and/or data may be based on resources allocated by the UE, which is referred to herein as Mode-2 operation.

As used herein, D2D communication may also be referred to as "sidelink" communication. Such communication shall be referred to herein as D2D communication for the sake of consistency.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
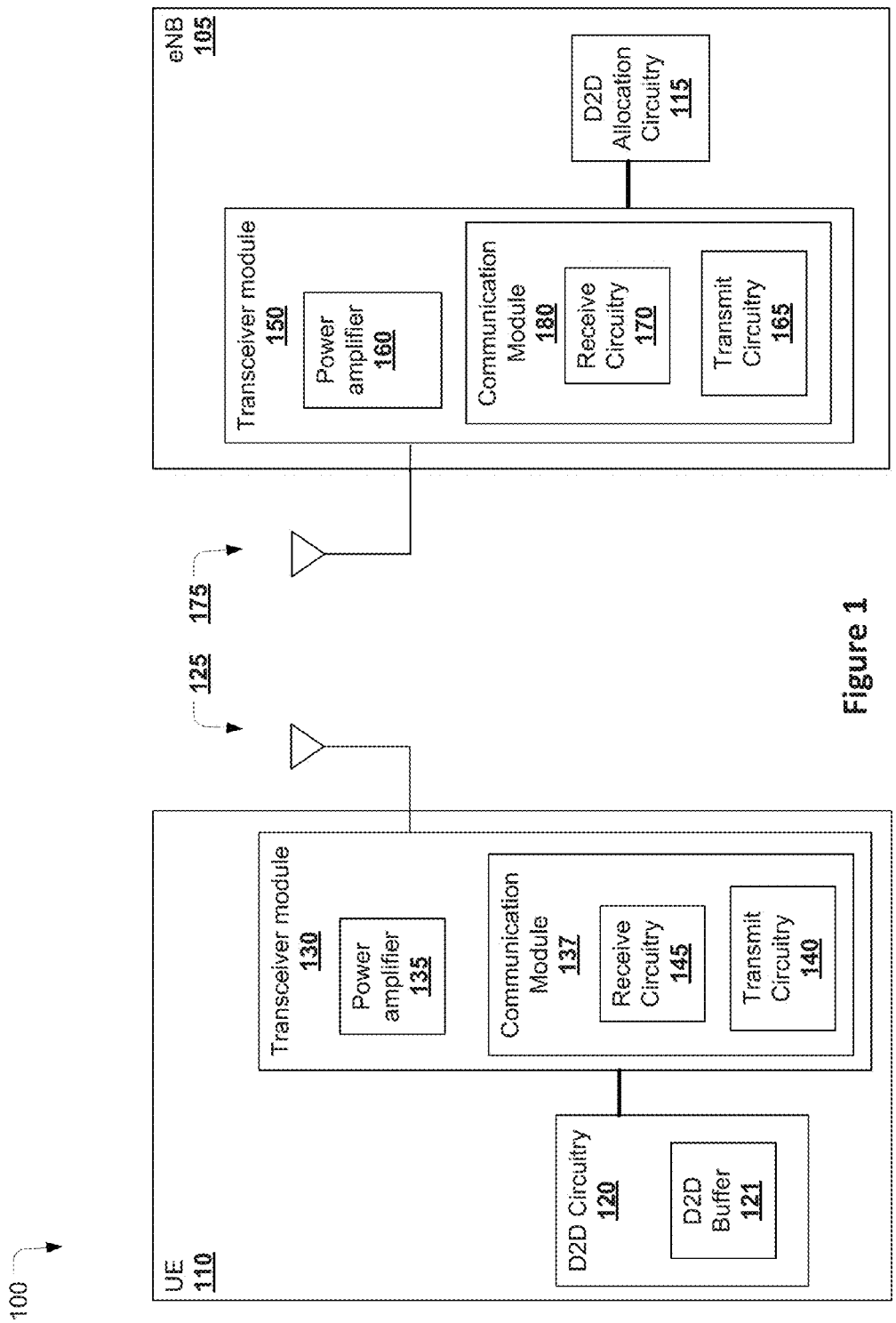
FIG. 1 schematically illustrates a high-level example of a network that includes a user equipment (UE) and an evolved NodeB (eNB), in accordance with various embodiments.

As noted above, D2D communication may include a two-step transmission of direct data. First, a transmitting UE may send control information via an SA and/or PSCCH transmission to a receiving UE. The control information may include information that the receiving UE needs to receive a corresponding data transmission from the transmitting UE. Secondly, the transmitting UE may send data via a D2D transmission that is in accordance with the control information. In some embodiments, the resources for the D2D transmission may be allocated by an eNB (Mode-1 operation). In other embodiments, the resources for the D2D transmission may be allocated by the transmitting UE (Mode-2 operation). In this description, only SA transmissions of control information may be described, but in some embodiments the SA transmissions may be considered to be a generic description of control information that may be transmitted by the SA and/or PSCCH.

In embodiments herein, media access control (MAC) protocol data units (PDUs) may be used to transmit the SA and/or D2D data. Embodiments herein may describe how one or more MAC PDUs may be mapped into a time resource pattern for transmissions (T-RPT). Embodiments herein may further describe examples of how and when a transmitting UE may skip resources such as subframes and/or transmission time intervals (TTIs) in transmissions of the SA and/or data. Additionally, embodiments herein may further describe examples of how a UE may behave if the UE cannot transmit one or more scheduled instances of SA or data.

Embodiments herein may also relate to D2D discovery transmission. Generally, D2D discovery may include transmission of discovery MAC PDUs. In embodiments, resources for discovery transmission may be allocated by eNodeB (Type 2B discovery) or by a UE (Type 1 discovery). Generally, as used herein, D2D communications may refer to both D2D communication and D2D discovery.

Embodiments of this disclosure may describe D2D transmission behavior that may optimize system level performance. Generally, eNB control may be increased in Mode-1 operation, and performance degradation may be reduced or minimized in Mode-1 and Mode-2 operation by applying one or more transmission opportunity dropping and postponing rules for SA and data as described herein.

Embodiments herein may be described with respect to a transmission opportunity bundle (TOB). A TOB may be a series of four consecutive transmission opportunities with a T-RPT wherein the starting transmission opportunity index is a multiple of 4 (e.g., 0, 4, 8, etc.) A TOB may be described more fully below.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed herein, the term "module" may be used to refer to one or more physical or logical components or elements of a system. In some embodiments a module may be a distinct circuit, while in other embodiments a module may include a plurality of circuits.

FIG. 1 schematically illustrates a wireless communication network 100 (hereinafter "network 100") in accordance with various embodiments. The network 100 may include a UE 110 that is communicatively coupled with an eNB 105. In embodiments, the network 100 may be a third generation partnership project (3GPP) long term evolution (LTE), LTE Advanced (LTE-A) and/or LTE-Unlicensed (LTE-U) network. In other embodiments, the network 100 may be some other type of wireless communication network.

As shown in FIG. 1, the UE 110 may include a transceiver module 130, which may also be referred to as a multi-mode transceiver chip. The transceiver module 130 may be configured to transmit and receive signals using one or more protocols such as LTE, LTE-A, and/or LTE-U protocols. Specifically, the transceiver module 130 may be coupled with one or more of a plurality of antennas 125 of the UE 110 for communicating wirelessly with other components of the network 100, e.g., eNB 105 or another UE via D2D communication. The antennas 125 may be powered by a power amplifier 135 which may be a component of the transceiver module 130 as shown in FIG. 1, or separate from but coupled with the transceiver module 130. In one embodiment, the power amplifier 135 may provide the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD), multiple-input multiple-output (MIMO), or full-dimension MIMO (FD-MIMO).

In certain embodiments the transceiver module 130 may include a communication module 137, which may be referred to as a baseband module, which may contain both transmit circuitry 140 configured to cause the antennas 125 to transmit one or more signals from the UE 110, and receive circuitry 145 configured to process signals received by the antennas 125. In other embodiments, the communication module 137 may be implemented in separate chips or modules, for example, one chip including the receive circuitry 145 and another chip including the transmit circuitry 140. In some embodiments, the transmitted or received signals may be cellular signals transmitted to or received from eNB 105. In some embodiments, the transceiver module 130 may include or be coupled with D2D circuitry 120. In embodiments, the D2D circuitry 120 may be to facilitate the transmission or reception of D2D signals from another UE via antennas 125 and/or communication module 137. In embodiments, the D2D circuitry 120 may be to identify one or more D2D signals to transmit, and/or identify the specific time frame, TTI, TOB, or resource on which to transmit the one or more D2D signals. In some embodiments the D2D circuitry 120 may include or be coupled with a D2D buffer 121. In embodiments, the D2D buffer 121 may be configured to receive and/or store one or more MAC PDUs for D2D transmission, as described below.

Similar to the UE 110, the eNB 105 may include a transceiver module 150. The transceiver module 150 may be further coupled with one or more of a plurality of antennas 175 of the eNB 105 for communicating wirelessly with other components of the network 100, e.g., UE 110. The antennas 175 may be powered by a power amplifier 160 which may be a component of the transceiver module 150, as shown in FIG. 1, or may be a separate component of the eNB 105. In one embodiment, the power amplifier 160 may provide the power for all transmissions on the antennas 175. In other embodiments, there may be multiple power amplifiers on or coupled to the eNB 105. The use of multiple antennas 175 may allow for the eNB 105 to use transmit diversity techniques such as SORTD, MIMO, or FD-MIMO. In certain embodiments the transceiver module 150 may contain both transmit circuitry 165 configured to cause the antennas 175 to transmit one or more signals from the eNB 105, and receive circuitry 170 to process signals received by the antennas 175. In embodiments, the transmit circuitry 165 and receive circuitry 170 may be elements of a communication module 180 of the transceiver module 150, as described above with respect to the UE 110. In other embodiments, the transceiver module 150 may be replaced by transmit circuitry 165 and receive circuitry 170 which are separate from one another or separate from the transceiver module 150 and/or communication module 180 (not shown). In some embodiments, the eNB 105 may include D2D allocation circuitry 115 which may be to allocate one or more resources for D2D transmission to a UE 110, for example, in Mode-1 operation.

Figure 2:
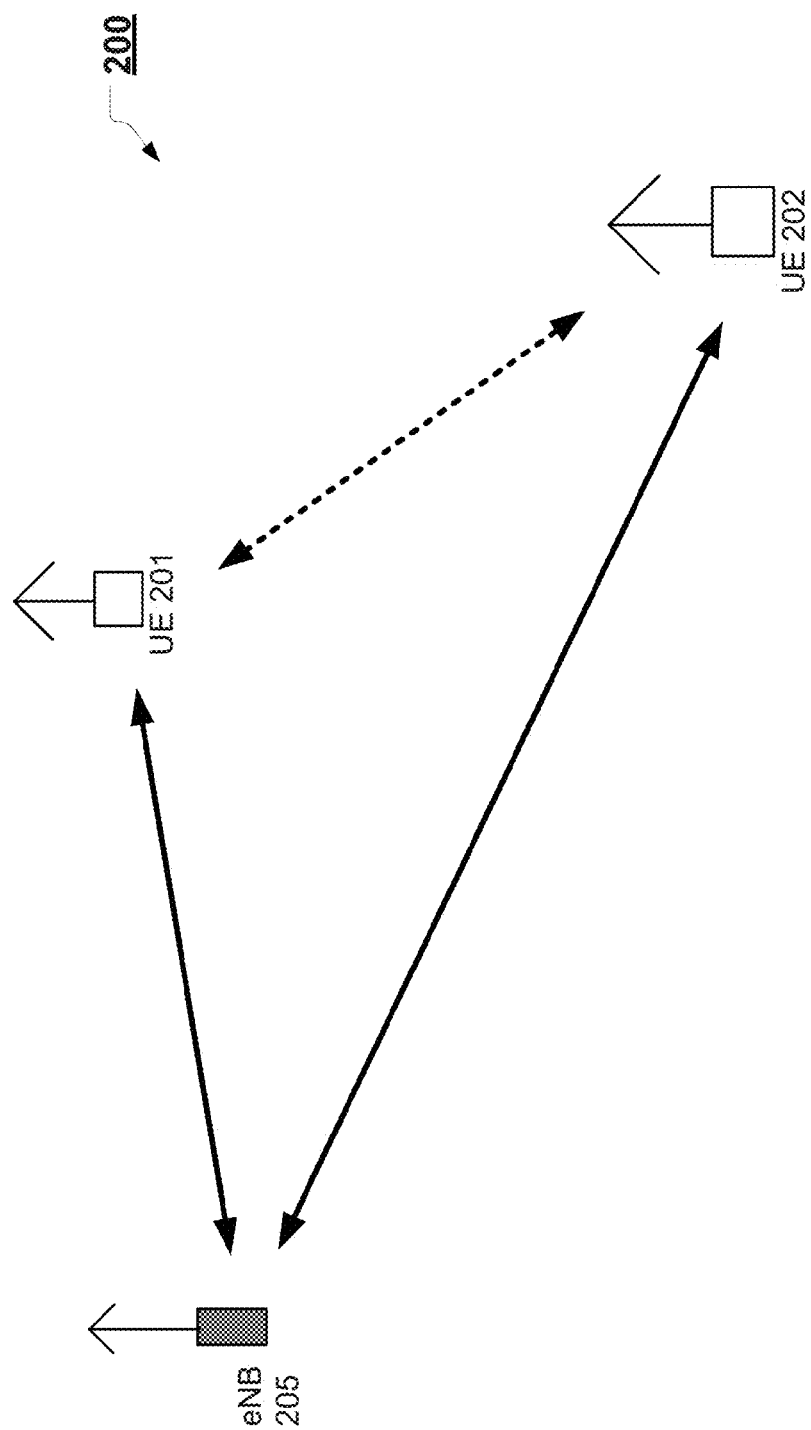
FIG. 2 illustrates a high-level example of a network that includes an eNB and multiple UEs, in accordance with various embodiments.

FIG. 2 depicts a high-level example of a network 200. The network 200 may include UEs 201 and 202, which may be respectively similar to UE 110 of FIG. 1. The network 200 may further include an eNB 205, which may be similar to eNB 105 of FIG. 1. In embodiments, the eNB 205 may be configured to transmit or receive one or more signals to or from UEs 201 and 202, for example, via a cellular transmission as indicated by the solid lines in FIG. 2. In some embodiments, the network 200 may be considered to be a wide area network (WAN), and transmissions between the eNB 205 and the UEs 201 or 202 may use resources of the WAN. Additionally, the UEs 201 and 202 may be configured to transmit or receive one or more signals to or from one another via D2D transmissions, as indicated by the dashed line. For example, the UEs 201 and 202 may exchange control information via one or more SA transmissions, and or data transmissions as explained herein.

Figure 3:
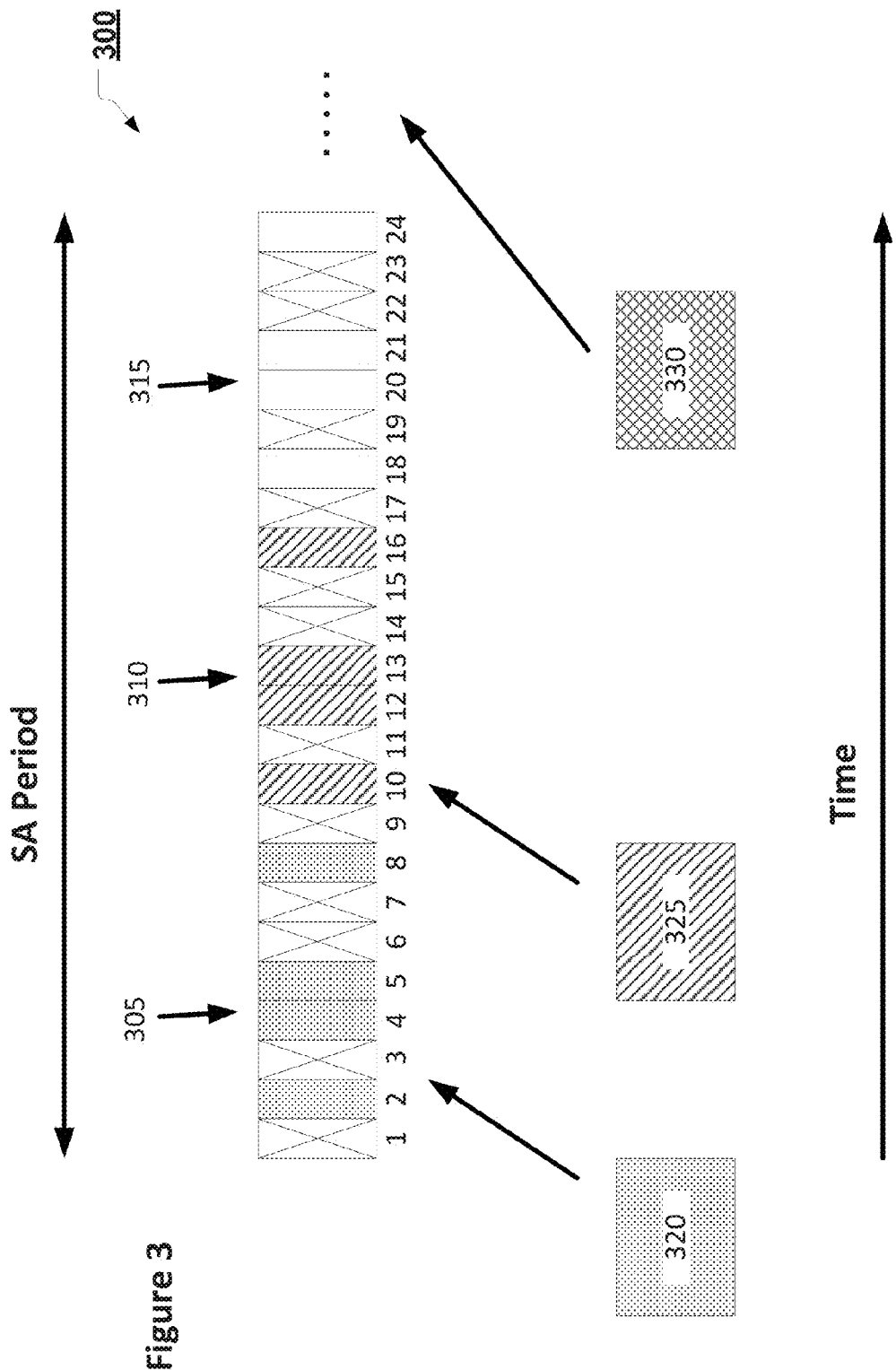
FIG. 3 illustrates an example framework for D2D transmission, in accordance with various embodiments.

FIG. 3 depicts an example of a T-RPT 300. The T-RPT 300 may span one or more SA periods as shown in FIG. 3. The T-RPT 300 may include a number of transmission time intervals (TTIs), which are sequentially numbered in FIG. 3 (1, 2, 3, etc.). The TTIs may represent a specific time period during which a transmission may be sent with a network such as network 200. In embodiments, each TTI may be 1 subframe and span 1 millisecond (ms) of time. TTIs within an SA period of a T-RPT 300 may be split into three separate TOBs 305, 310, and 315. TOB 305 may span TTIs 1-8, TOB 310 may span TTIs 9-16, and TOB 315 may span TTIs 17-24. Although a TOB such as TOB 305 may span eight TTIs, The TOB 305 may only be available for data transmission on four of the TTIs, for example, TTIs 2, 4, 5, and 8 as indicated by the shading in FIG. 3. TTIs 1, 3, 6, and 7 may be unavailable for D2D transmission. In Mode-1 operation, TTIs 2, 4, 5, and 8 may be allocated for D2D transmission by a UE such as UE 110 by an eNB such as eNB 105. Specifically, the eNB 105 may allocate the TTIs for D2D transmission in a downlink control information (DCI) format 5 transmission to the UE 110. In Mode-2 operation, TTIs 2, 4, 5, and 8 may be allocated for D2D transmission by a UE such as UE 110, and specifically by D2D circuitry 120 of UE 110. Generally, the TOB may be considered as four consecutive transmission opportunities, i.e., TTIs 2, 4, 5, and 8.

A MAC PDU such as MAC PDUs 320, 325, and/or 330 may be received by a UE such as UE 110 and stored in a D2D buffer such as D2D buffer 121. The MAC PDU may include SA control information related to a D2D transmission, or it may include D2D data. Information from the MAC PDU (e.g., the SA control information or the D2D data) may be allocated to one or more TOBs. For example, MAC PDU 320, which may be received prior to the start of the T-RPT 300, may be allocated to TOB 305. MAC PDU 325, which may be received during TOB period 305, may be allocated to TOB 310. MAC PDU 330, which may be received during TOB 315, may be allocated to a subsequent SA period.

It will be understood that the numbering of the TTIs in T-RPT 300 is merely for the sake of discussion and example, and in other embodiments the various TTIs may be numbered and/or referred to differently. Additionally, although only three TOBs 305, 310, and 315 and a single SA period are shown in T-RPT 300, in other embodiments the T-RPT 300 may include more or fewer TOBs than shown in FIG. 3.

MAC PDU Transmission Mapping in Mode-1

As noted above, in Mode-1 operation, an eNB such as eNB 205 may control D2D transmission between UEs such as UE 201 and 202 by allocating resources in a DCI Format 5 transmission. Specifically, the eNB 205 may transmit an indication of the T-RPT 300 in a DCI Format 5 transmission. In some cases, an amount of the allocated TTIs for a T-RPT 300 may be larger than the amount of TTIs required to transmit buffered data in the T-RPT 300. For example, T-RPT 300 may include 3 TOBs 305, 310, and 315. However, only MAC PDUs 320 and 325 may be in a buffer of a UE such as D2D buffer 121. As shown in FIG. 3, all of the available TOBs 305, 310, and 315 of T-RPT 300 may not be necessary to transmit MAC PDUs 320 and 325.

Transmit Dummy Bits

In one embodiment, a UE such as UE 201 may transmit SA control data and/or D2D data on all T-RPT resources and/or TTIs. In some cases, this transmission may not occur if transmission on a TTI conflicts with transmission using WAN resources. However, assuming that there is no conflict, if the UE 201 does not have SA control data or D2D data to transmit in a D2D buffer 121 of the UE 201, the UE 201 may fill empty TTIs of the T-RPT 300 with "dummy" bits that include either un-necessary or repetitive data. Alternatively, the UE 201 may repeat transmission of a previous MAC PDU until new data is available. The transmission of repeated or dummy bits may simplify link adaptation and interference control, because the eNB 205 may know the interference source at each subframe during a given SA period and/or T-RPT 300. However, the transmission of repeated data and/or dummy bits may introduce un-necessary interference to ongoing parallel transmissions of either the WAN or D2D transmission, increase energy consumption of the transmitting UE 201, and potentially reduce a time reuse factor in case of low data rates.

Skip Transmission

In an alternative embodiment, instead of transmitting dummy bits or repeating transmissions of previous MAC PDUs, the UE 201 may not transmit on allocated TTIs of the T-RPT 300 if the UE 201 does not have SA control data or D2D data to transmit on those TTIs. In this embodiment, the modulation and coding scheme (MCS) that may be taken into account by the eNB and/or UE to decide and/or identify the T-RPT may be set by one or more signals from the eNB 205 such as higher layer signal or the DCI Format 5 signal described above. Specifically, the eNB 205 may control and/or know the instantaneous transmit data rate of the UE 201, and it may adjust the amount of allocated resources (e.g., TTIs) in the T-RPT 300 according to the UE buffer status reports. Alternatively, the MCS may be decided by the UE 201. In this case, the eNB 205 may not be able to control the instantaneous transmit data rate of the UE 201. Therefore, if transmit behavior of the UE 201 is not specified, the UE 201 may skip the transmission opportunity bundles if the D2D buffer 121 of UE 201 is empty. In scenarios where the eNB 205 signals the MCS or the UE 201 decides the MCS, the D2D buffer 121 may be fully empty and, in this situation, it may be desirable for the UE 201 to not transmit in any of the TOBs 305, 310, or 315 of T-RPT 300.

In some situations, once a UE 201 has begun transmission in a T-RPT, an additional MAC PDU may be stored in the D2D buffer 121 of the UE 201. For example, MAC PDUs 320 and 325 may have been allocated to TOBs 305 and 310, and the UE 201 may have identified that it is not to transmit on TTIs of TOB 315, or it is to transmit repeated or dummy bits on TTIs of TOB 315. An additional MAC PDU may be identified concurrently with, for example, TTI 11 of T-RPT 300. In some embodiments, the UE 201 may wait to transmit the additional MAC PDU until the next SA period of the T-RPT. In some embodiments, the UE 201 may transmit the data of the new MAC PDU in TOB 315. In some embodiments, this decision may be based on direction by the eNB 205, while in other embodiments the decision to transmit or not transmit on TOB 315 may be made by the UE 201.

MAC PDU Transmission Mapping in Mode-2 Operation

As discussed above, in some cases, an amount of the allocated TTIs for a T-RPT 300 may be larger than the amount of TTIs required to transmit buffered data in the T-RPT 300. Also, as discussed above, in Mode-2 operation a UE such as UE 201 may be able to autonomously (that is, without input from an eNB such as eNB 205) identify D2D resources such as TTIs and TOBs in a T-RPT such as T-RPT 300.

In embodiments where the UE 201 is in accordance with Mode-2 operation, the UE 201 may be able to utilize TOB skipping in a fashion similar to that described above with respect to Mode-1 operation. In particular, the UE 201 may intentionally skip transmission on one or more TOBs of a T-RPT such as T-RPT 300 subject to the status of the D2D buffer 121 of the UE 201 and latency constraints of the network 200.

Transmit Upon Arrival

Figure 4:
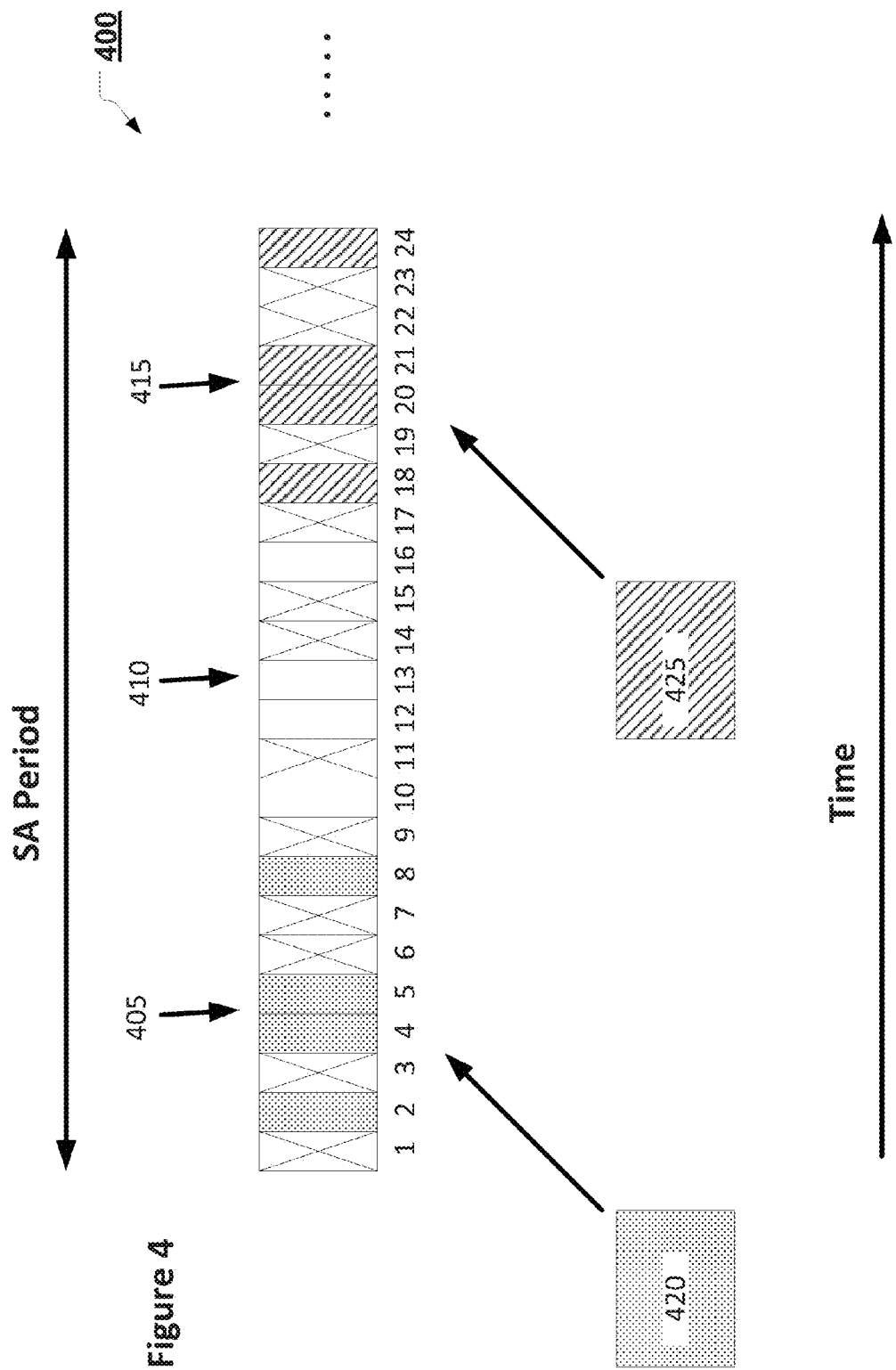
FIG. 4 illustrates an example transmission scheme for D2D transmission, in accordance with various embodiments.

In one embodiment, the UE 201 may simply transmit a received MAC PDU in the next available TOB. FIG. 4 depicts an example diagram of a transmit-upon-arrival scheme. Specifically, FIG. 4 may include a T-RPT 400 that may be similar to T-RPT 300 of FIG. 3. T-RPT 400 may include an SA period that includes three TOBs 405, 410, and 415. Once a MAC PDU such as MAC PDUs 420 and 425 are identified, the MAC PDUs 420 and 425 may be transmitted in the next available TOB. Specifically, when a MAC PDU arrives to the L1/L2 layer of the D2D circuitry 120, the UE 201 may transmit the MAC PDU in the nearest TOB within the T-RPT 400. This scheme assumes the possibility to send SA control information even if there are no MAC PDUs in the D2D buffer 121, but the D2D circuitry 120 expects one or more MAC PDUs to arrive at the D2D buffer 121. In this case, the UE 201 may transmit the MAC PDU once it is available, and may skip data transmission on any TOB within T-RPT.

In the example of FIG. 4, MAC PDU 420 may arrive at the D2D buffer 121 prior to the beginning of TOB 405, and so it may be transmitted on the resources of TOB 405. MAC PDU 425 may arrive during TOB 410, and so it may be transmitted on the resources of TOB 415. Notably, in FIG. 4, it may be seen that because there is no data to transmit on the resources of TOB 410, the UE 201 does not transmit on the resources of TOB 410.

Buffer Before Transmission

Figure 5:
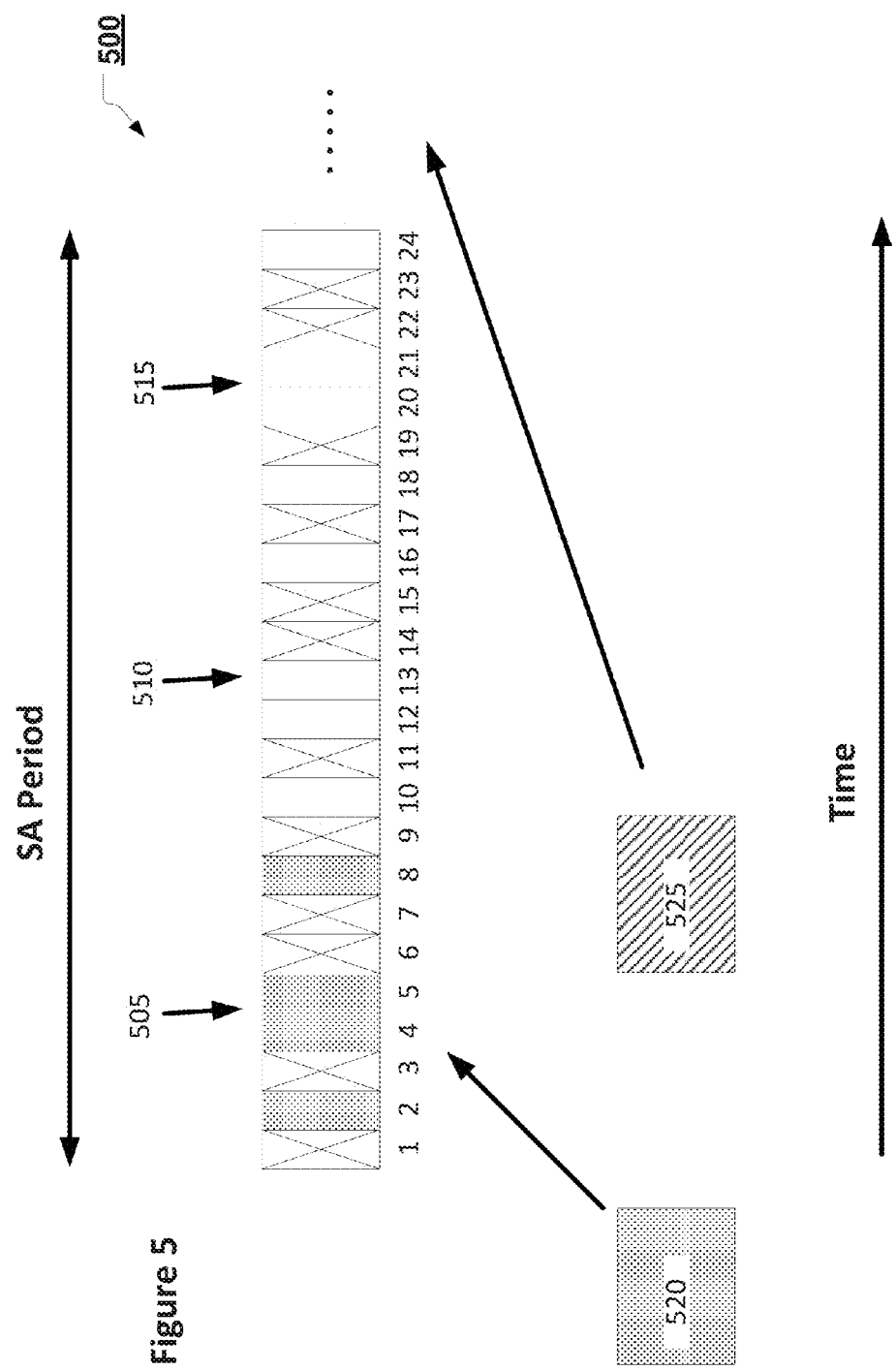
FIG. 5 illustrates an alternative example transmission scheme for D2D transmission, in accordance with various embodiments.

In an alternative embodiment, the UE 201 may store received MAC PDUs in the D2D buffer 121 to be transmitted on TOBs of an SA period subsequent to the SA period in which the MAC PDUs were received at the D2D buffer 121. FIG. 5 depicts an example of a buffer-before-transmission scheme. Specifically, FIG. 5 depicts a T-RPT 500 that may be similar to T-RPT 300 of FIG. 3. The T-RPT 500 may include an SA period that includes three TOBs 505, 510, and 515. As shown in FIG. 5, a MAC PDU 520 may be received prior to the start of the SA period. The UE 201 may then transmit MAC PDU 520 in the first TOB 505 of the SA period. MAC PDU 525 may be received during the SA period, and so it may be transmitted on a TOB of the next SA period in the T-RPT 500.

Generally, in the buffer-before-transmission scheme, the UE may send SA control data or D2D data only if it has one or more MAC PDUs stored in the D2D buffer, and then transmit all of the stored PDUs without skipping transmission on subsequent TOBs of the T-RPT 500, starting from the first available TTI of the SA period. Similarly to the Mode-1 operation behavior described above, the UE 201 may stop D2D transmission if the D2D buffer 121 is empty, and resume D2D transmission at the next SA period.

As shown in FIG. 5, if the UE 201 operates in the buffer-before-transmission scheme, then interference load may be concentrated in the beginning of an SA period while the UE 201 is transmitting the buffered MAC PDUs, and the remainder of the SA period may be under-utilized by the network 200. To mitigate this underuse, the UE 201 may insert gaps within T-RPT if the latency budget is not concerned. That is, a TOB such as TOB 505 may be expanded to include portions of TOB 510, and one or more TTIs of TOBs 505 and 510 may not transmit data. For example, MAC PDU 520 may be transmitted on TTIs 2, 5, 10, and 13. However, this expansion may increase latency of the network 200 in some embodiments.

In other embodiments, the UE 201 may pseudo-randomly skip transmission (i.e., insert a transmission gap) on the TOBs of the T-RPT 500. The behavior of the UE 201 in terms of skipping transmissions may ensure that all of the MAC PDUs in the D2D buffer 121 fit into the T-RPT 500 without violating latency requirements. In one embodiment, this may be assured by first estimating the number of MAC PDUs for transmission in a given SA period. This number of MAC PDUs may be designated as $N_{PDU}$. Next the number of TOBs of T-RPT that can be skipped within an SA period may be calculated as $$N_G = \left\lfloor \frac{M}{4} \right\rfloor - N_{PDU}$$

where M is the total number of available TTIs for a given T-RPT within an SA period, and $N_G$ refers to the number of TOBs of T-RPT that can be skipped for an SA period. Finally, the UE 201 may pseudo-randomly select $N_G$ TOBs within the SA period. In some embodiments, the start transmission opportunity index of each skipped TOB may be a multiple of 4. That is, the UE 201 may only begin transmission every fourth available TTI.

Handling of SA Transmission Collision

In some cases, a transmission to or from the eNB 205 to one or more UEs 201 or 202 in the network 200 (i.e., a WAN transmission) may occur simultaneously with a D2D transmission between the UEs 201 and 202. In some cases, the WAN transmission and the D2D transmission may be assigned to the same UE and to use the same resources, e.g., the same TTI. In this case, the WAN transmission may collide with the D2D transmission on a single UE, and the WAN transmission may be prioritized. It will be understood that the above is only one example of a collision with a D2D transmission, and in other embodiments an intended D2D transmission may collide with one or more other transmissions. Generally, the embodiments herein may be used when a D2D transmission collides with another transmission that has a higher priority such that the D2D transmission may be dropped. For the purposes of example herein, the WAN transmission will be used as one example case to illustrate present embodiments of handling of transmission collision of a D2D transmission with another transmission. As used herein, "dropped" may refer to the non-performance of a particular transmission. For example, if signals A and B collide, and signal A is identified to be dropped, then the wave form of signal B may be generated and signal B may be transmitted. The waveform of signal A may not be generated, and signal A may not be transmitted.

In some embodiments, a UE such as UE 201 may transmit SA control information at two instances within an SA period of a T-RPT such as T-RPT 300, for example, at two different TTIs of a TOB such as TOB 305 of FIG. 3. The TTIs of TOB 305 will be referred to herein as SA control TTIs. In some cases the WAN transmission may collide with one or both of the SA control TTIs.

In one optional embodiment, if the WAN transmission collides with the first SA control TTI, then the UE may not transmit any further SA control information or D2D data in the TOB 305 and/or the SA period. In another optional embodiment, if the WAN transmission collides with the first SA control TTI, then the UE may still transmit the second SA control TTI and transmit data in TOB 305 and/or other TOBs of the SA period. In another optional embodiment, if the WAN transmission collides with the second SA control TTI, then the UE may still transmit D2D data in TOB 305 and/or remaining TOBs of the SA period. In another optional embodiment, if the WAN transmission collides with the second SA control TTI, then the UE may not transmit data in TOB 305 and/or other TOBs of the SA period. Generally, if the WAN transmission conflicts with both of the SA control TTIs of TOB 305, then the UE may not transmit data in TOB 305 and/or other TOBs of the SA period.

In some embodiments, the behavior of the UE receiving the D2D transmission such as UE 202 may be useful in identifying which of the above optional embodiments should be selected for UE 201. For example, if the receiving UE 202 detects a first transmission of SA control information, then it may act in accordance with the SA control information. For example, the receiving UE 202 may, based on the SA control information, identify and decode further transmissions of D2D data. However, if D2D data does not follow the SA control information, then the receiving UE 202 may waste energy in searching for D2D data and processing empty or missing transmissions.

In some additional embodiments where the D2D transmissions are in accordance with Mode-1 operation, the eNB 205 may be controlling both the WAN transmissions and the D2D transmissions. In this embodiment, the UE 201 may transmit a second transmission of SA control information at, for example, TOB 310 if the first transmission of SA control information at, for example, TOB 305 collides with a WAN transmission. Alternatively, if the D2D transmissions are in accordance with Mode-2 operation, the UE 201 may identify that a first transmission of SA control information collides with a WAN transmission. The UE 201 may then identify whether to skip remaining transmissions with the SA period of either SA control information or D2D data based on, for example, latency considerations or other considerations.

Figure 6:
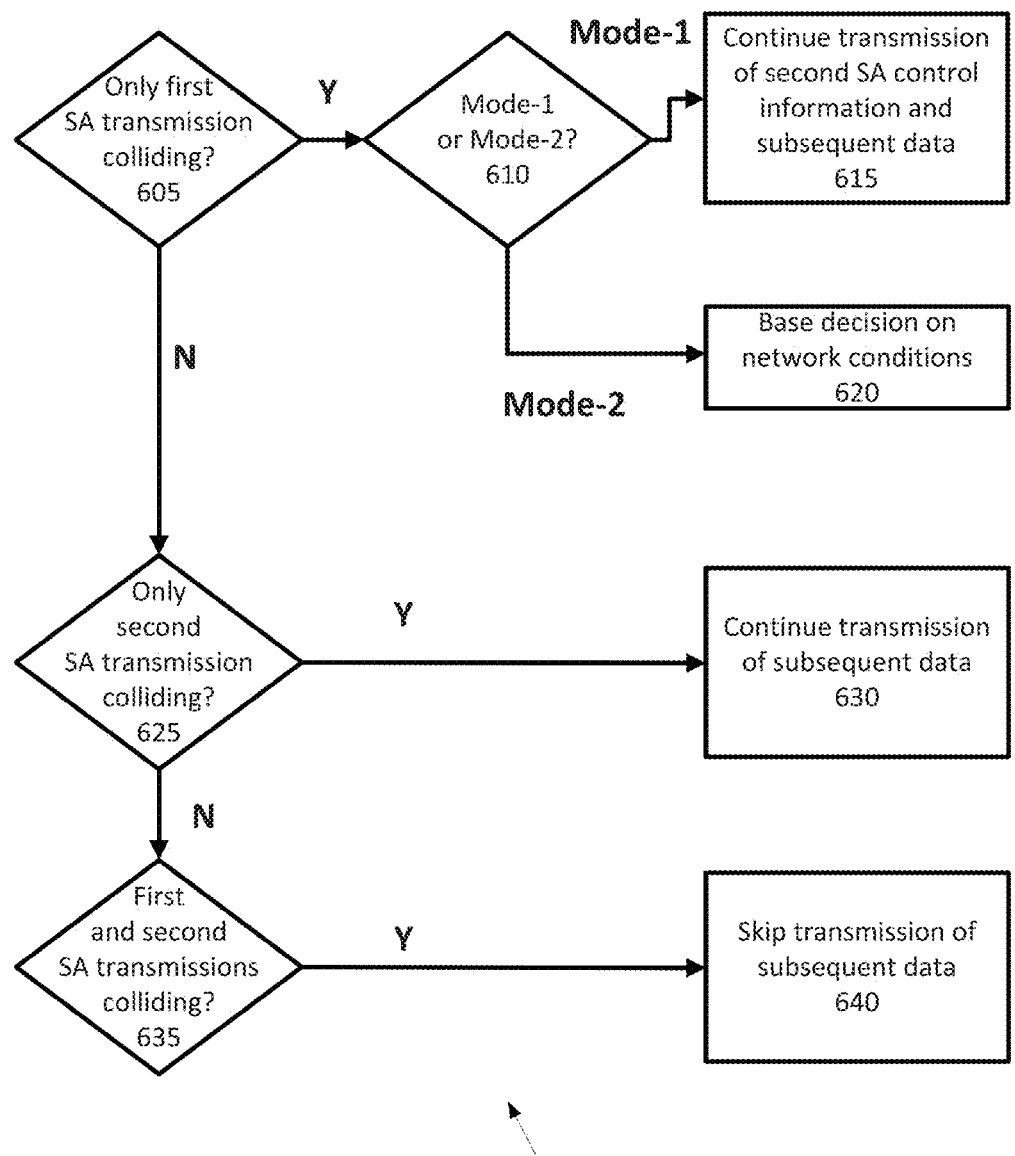
FIG. 6 illustrates an example D2D logic scheme, in accordance with various embodiments.

FIG. 6 depicts an example of logic 600 that may be used to identify UE behavior in the case of collision of a first and/or second SA transmission with a WAN transmission. The logic 600 may be performed by, for example, the transmitting UE 201. Initially, the transmitting UE 201 may identify at 605 whether only the first SA transmission collides with the WAN transmission. If so, the UE 201 may identify at 610 whether the D2D transmissions are operating in accordance with Mode-1 operation or Mode-2 operation. If the D2D transmissions are in accordance with Mode-1 operation, the UE 201 may continue transmission of the second SA control information and subsequent D2D data at 615. If the D2D transmissions are in accordance with Mode-2 operation, the UE 201 may autonomously decide at 620 whether to transmit the second SA control transmission or skip further transmissions in the SA period based, for example, on network conditions, latency requirements, or some other basis.

If the UE 201 identifies that it's not only the first SA transmission colliding with the WAN transmission at 605, the UE 201 may identify at 625 whether only the second SA transmission is colliding with the WAN transmission. If so, the UE 201 may still continue transmission of subsequent D2D data in the SA period at 630.

If the UE 201 identifies at 625 that it's not only the first or only the second SA transmissions colliding at 605 and 625, the UE 201 may identify at 635 whether both the first and second SA transmissions are colliding at 635. If so, the UE 201 may skip subsequent transmissions with the SA period at 640, for example, of D2D data.

Handling of Data Transmission Collision

In some cases, a WAN transmission to or from eNB 205 (or some other transmission with a higher priority than a D2D transmission) may conflict with transmission of D2D data within an SA period. As noted previously, the UE 201 may transmit the D2D data over multiple TTIs within a given TOB. Therefore, it may be possible that the WAN transmission conflicts with one of the TTIs with the TOB, and different behaviors may be considered.

Figure 7:
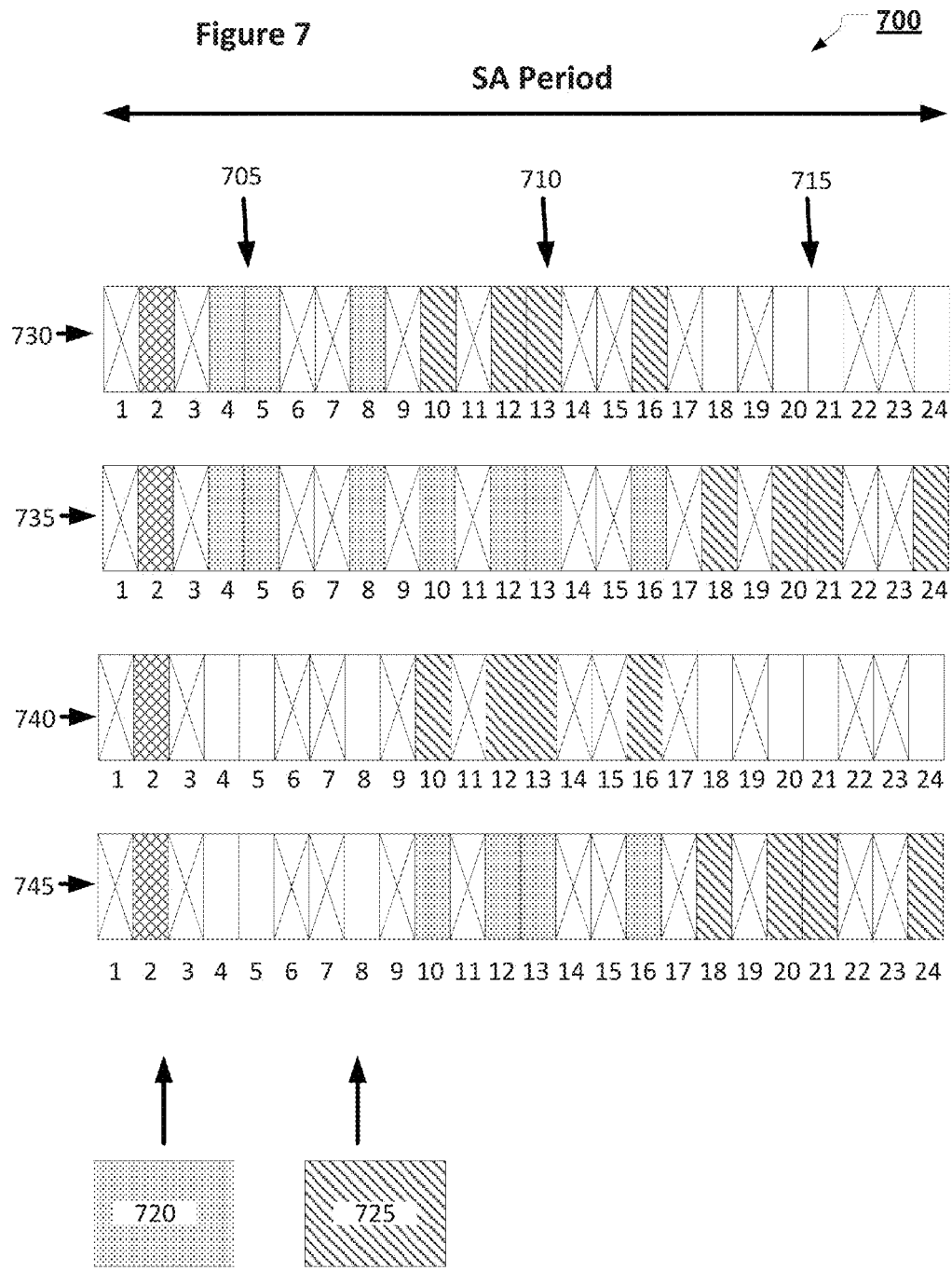
FIG. 7 illustrates several alternative example transmission schemes in the event of transmission collision, in accordance with various embodiments.
Figure 8:
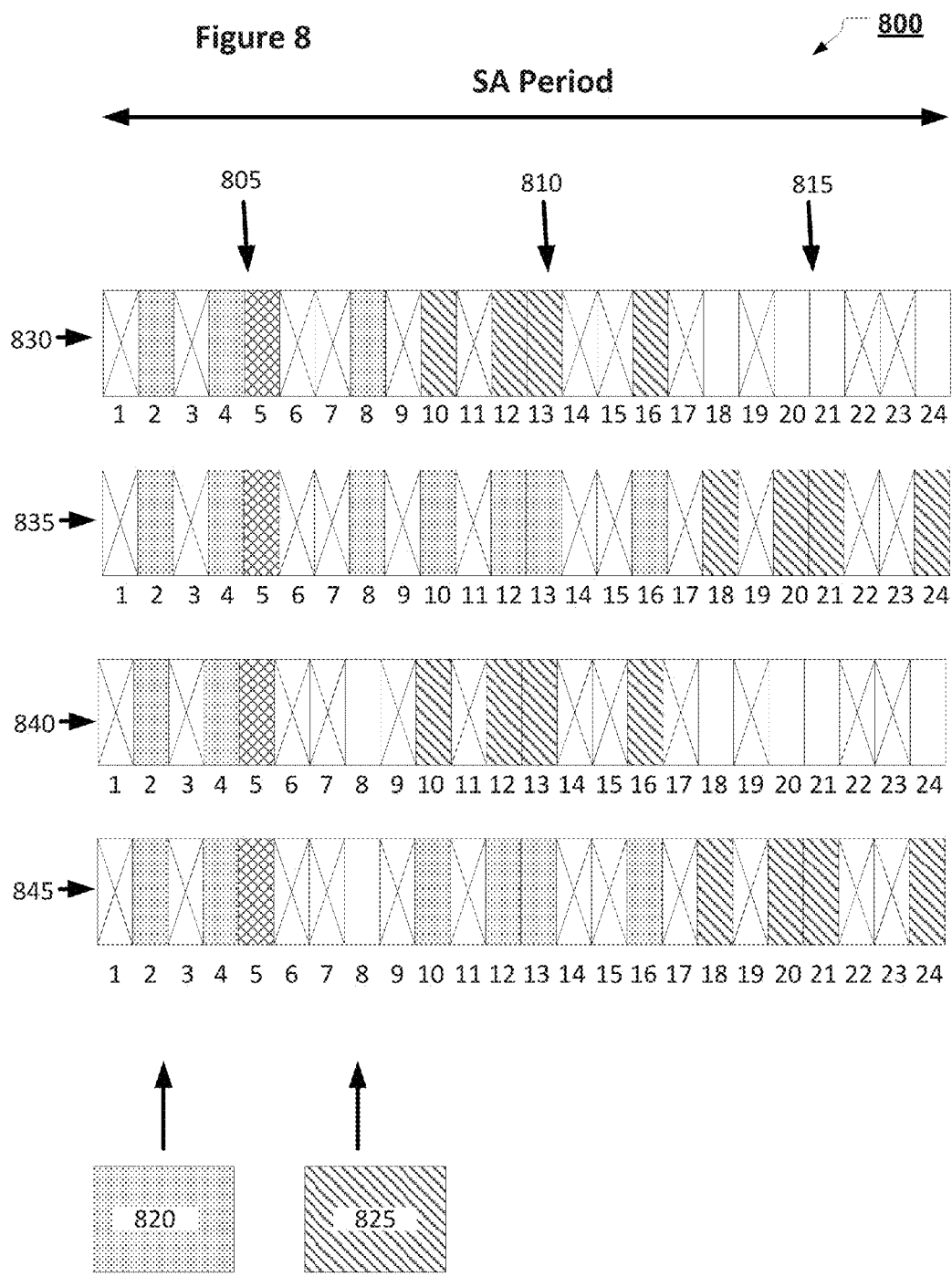
FIG. 8 illustrates additional alternative example transmission schemes in the event of transmission collision, in accordance with various embodiments.

FIG. 7 depicts an example of different behaviors if the WAN transmission collides with a first TTI of a TOB. FIG. 8 depicts an example of different behaviors if the WAN transmission collides with a TTI of a TOB that is not the first TTI of the TOB. Specifically, FIGS. 7 and 8 depict a T-RPT 700 and 800 with an SA period split into three TOBs 705/805, 710/810, and 715/815, which may be respectively similar to T-RPT 300 and TOBs 305, 310, and 315. TOBs 705 and 805 may carry information related to MAC PDUs 720 and 820, which may be similar to MAC PDU 320. TOBs 710 and 810 may carry information related to MAC PDUs 725 and 825, which may be similar to MAC PDU 325. The collided TTI in the example alternative behaviors 730, 735, 740, and 745 is TTI 2 (the first available TTI of TOB 705) while the collided TTI in the example alternative behaviors 830, 835, 840, and 845 is TTI 5 (the third available TTI of TOB 805). Generally, MAC PDUs 720/820 are intended in this example, prior to detection of the collision, to be transmitted in TOBs 705/805, and MAC PDUs 725/825 are intended in this example, prior to detection of the collision, to be transmitted in TOBs 710/810.

As a first alternative behavior shown at 730 and 830, the UE 201 may continue to transmit MAC PDUs 720/820 in the non-collided TTIs of TOBs 705/805. This behavior may be desirable in sparse Mode-2 configurations because there may not be any other opportunities to transmit the MAC PDU 720/820 with a given latency budget. Specifically, sparse Mode-2 resource pool configurations may refer to configurations where only a small fraction of subframes in the Mode-2 resource pool are allowed for D2D communications.

As a second alternative behavior shown at 735 and 835, the UE 201 may continue to transmit MAC PDUs 720/820 in the non-collided TTIs of TOBs 705/805, and then restart transmission of the MAC PDUs 720/820 in the next available TOB. For example, MAC PDUs 720/820 may be transmitted in both TOBs 705/805 (where the collision occurs) and 710/810 (the next available TOBs). MAC PDUs 725/825 may be transmitted in TOBs 715/815.

As a third alternative behavior shown at 740 and 840, the UE 201 may drop transmission of the MAC PDU within the TOB with the collided TTI. For example, as shown at 740, the collision may occur at TTI 2 of TOB 705, and so the remaining TTIs of TOB 705 (TTIs 4, 5, and 8) may not include a transmission. MAC PDU 720 may be transmitted in a subsequent SA period. Similarly, as shown at 840, MAC PDU 820 may be transmitted at TTIs 2 and 4, and then the collision may occur at TTI 5. The UE 201 may not transmit any data on TTI 8 (the remaining TTI of TOB 805). MAC PDU 820 may be retransmitted (if necessary) in a subsequent SA period.

As a fourth alternative behavior shown at 745 and 845, the UE 201 may drop transmission of the MAC PDU within the TOB with the collided TTI, and then retransmit the MAC PDU in a following TOB. For example, as shown at 745, a collision may occur at TTI 2 of TOB 705, and so the remaining TTIs of TOB 705 (TTIs 4, 5, and 8) may not include a transmission. MAC PDU 720 may be retransmitted in TOB 710, and then MAC PDU 725 may be transmitted in TOB 715. Similarly, as shown at 845, MAC PDU 820 may be transmitted at TTIs 2 and 4, and then the collision may occur at TTI 5. The UE 201 may not transmit any data on TTI 8 (the remaining TTI of TOB 805), and then retransmit MAC PDU 820 in TOB 810. MAC PDU 825 may be transmitted in TOB 815.

In some embodiments, the UE 201 may not be able to restart MAC PDU transmission in a subsequent TOB as shown in alternatives 735/835 and 745/845 due to transmission latency requirements. Therefore, it may be desirable for the UE 201 to continue transmission in remaining TTIs of a TOB in the event of a collision (as shown in 730/830 and 735/835) to maximize coverage. However, if latency requirements permit, retransmission of a collided TTI as shown in 735/835 or 745/845 may be desirable to ensure that the MAC PDU 720 is successfully transmitted.

In some cases, the choice of the four alternatives described above may be based on whether the D2D transmissions are in accordance with Mode-1 operation or Mode-2 operation, because in Mode-1 operation the postponement of a MAC PDU transmission may result in a mismatch between resources allocated by the eNB 205 and resources used by the UE 201. Generally, alternatives 735/835 may satisfy both coverage and latency requirements in a majority of situations.

Handling of Discovery Transmission Collision

In some cases, a discovery message may be transmitted by one or both of UEs 201 or 202. The discovery message transmissions may be repeated, for example, up to four times, within a given discovery period. The discovery message transmission may be a transmission of a discovery MAC PDU. In some cases, transmission of the discovery MAC PDU may collide, from the transmitting UE's perspective, with other WAN and/or D2D transmissions as described above.

For example, in some embodiments physical random access channel (PRACH) transmissions in the network 200 may be prioritized over discovery message transmission if there is a time-domain collision between the PRACH transmission and the transmission of the discovery MAC PDU such that the PRACH transmission and the discovery MAC PDU attempt to use the same TTI.

Additionally, time-domain collisions may be possible between D2D Type 1 and Type 2B discovery transmissions. Generally, Type 1 discovery may refer to discovery wherein resources are identified and allocated by the UE. Type 2B discovery may refer to discovery wherein the discovery resources are assigned by the eNB. In some embodiments, the UE 201 may intend to transmit a first discovery message that includes one or more D2D discovery MAC PDUs according to Type 1 operation. The UE 201 may be further scheduled to transmit a second discovery message that includes one or more D2D discovery MAC PDUs according to Type 2B operation. In some embodiments one or both of the D2D discovery MAC PDUs may be MAC PDUs related to a sidelink channel such as a physical sidelink discovery channel (PSDCH). In some cases, the first and second discovery messages may collide with one another, that is, they may be scheduled to use the same time-domain resource(s) such as the same TTI, subframe, TOB, slot, resource within a slot, or some other resource within a resource period such as a subframe. In these embodiments, the Type 2B discovery transmission may be prioritized, and the Type 1 discovery transmission on the subframe where the collision occurred may be dropped, that is the UE may not generate the waveform related to the discovery message or transmit the discovery message according to Type 1 operation.

In some embodiments, for Type 2B discovery where the discovery resources may be assigned by the eNB 205, the UE 201 may continue D2D transmission of discovery MAC PDUs on other TTIs of a TOB in which a collision occurred. Doing so may ensure effective use of allocated resources and facilitate opportunistic reception at a receiving UE such as UE 202. The opportunistic reception may allow the receiving UE 202 to successfully decode the discovery message based on reception of only a subset of repeated transmissions of the discovery MAC PDU within the discovery period.

For Type 1 discovery, because the discovery resource allocation may be periodic and/or non-UE-specific, subsequent transmissions of the discovery MAC PDU may be dropped once an initial or repeated transmission of the discovery MAC PDU is dropped due to time-domain conflicts with a WAN transmission or a higher priority D2D transmission. However, if the time-domain conflict occurs for one of the repeated transmissions, it may not be possible in Type 1 discovery for the transmitting UE 201 to predict whether another time-domain conflict may occur. Therefore, for Type 1 discovery, the transmitting UE 201 may continue transmission of a discovery MAC PDU on other TTIs or subframes of a discovery resources period irrespective of whether one or more of the transmissions of the discovery MAC PDU are dropped.

Figure 10:
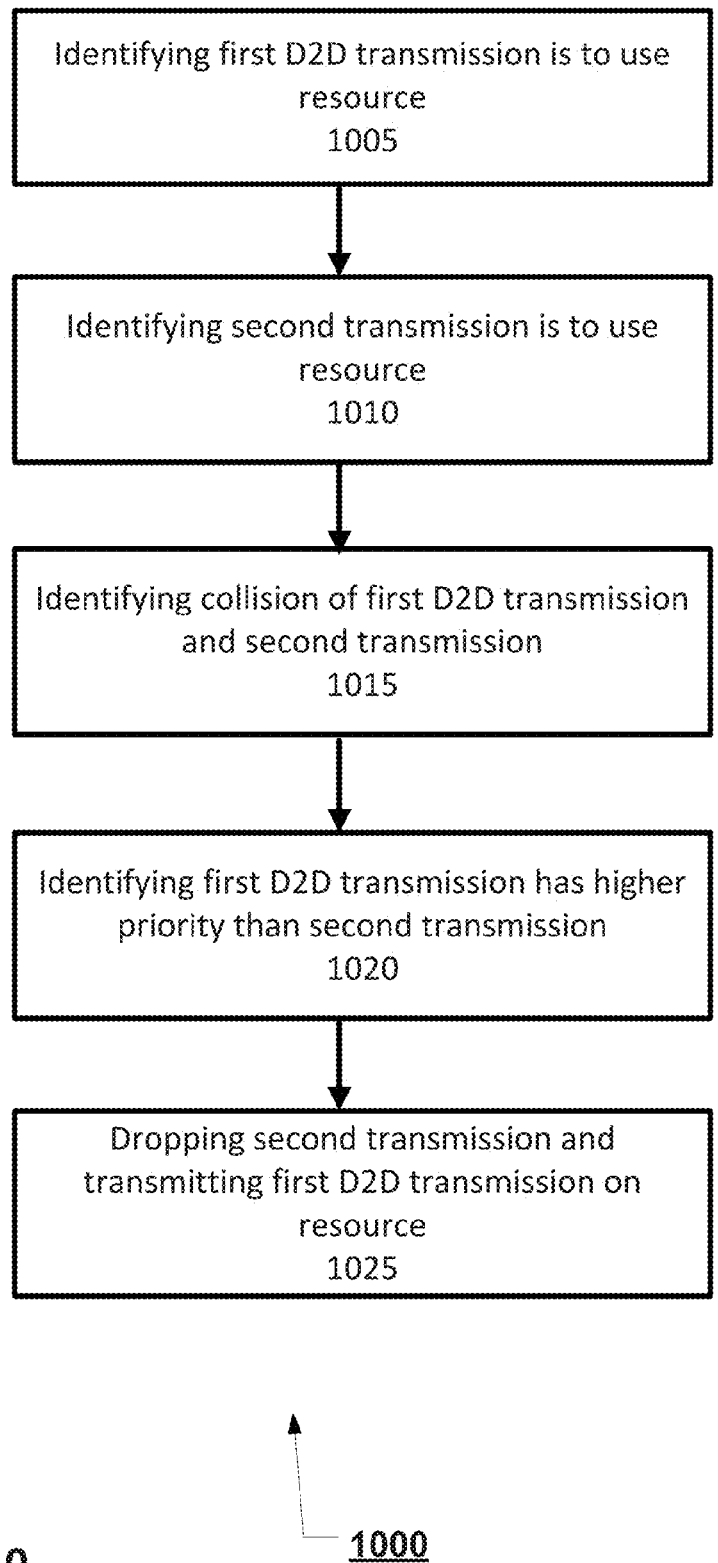
FIG. 10 illustrates an example process that may be performed by a UE, in accordance with various embodiments.

FIG. 10 depicts an example process 1000 that may be performed by a UE such as UE 201. Initially, the process may include identifying that a first D2D transmission is to use a resource at 1005. Specifically, the process may include identifying at 1005 that a D2D transmission by the UE of a first discovery MAC PDU on a resource of a discovery period is to occur. The process 1000 may then include identifying that a second transmission is to use the time-resource at 1010. For example, a WAN transmission of a second MAC PDU and/or a second D2D transmission of a second MAC PDU may also intend to use the same time-resource. In some embodiments, the first D2D transmission may be configured according to Type 2B discovery, and the second transmission may be a D2D discovery transmission configured according to Type 1 discovery. The process 1000 may then include identifying that the first D2D transmission and the second transmission will collide because the first D2D transmission and the second transmission may either be scheduled or be autonomously selected by the UE 201 to use the same resource at 1015. Based on the collision, the process 1000 may then include identifying that the first D2D transmission has a higher priority than the second transmission at 1020. For example, if the first D2D transmission is configured according to Type 2B discovery, and the second transmission is configured according to Type 1 discovery, then the first D2D transmission may have higher priority. The process 1000 may then include dropping, based on the identification of the priority, the second transmission and transmitting the first D2D transmission on the resource at 1025.

Figure 9:
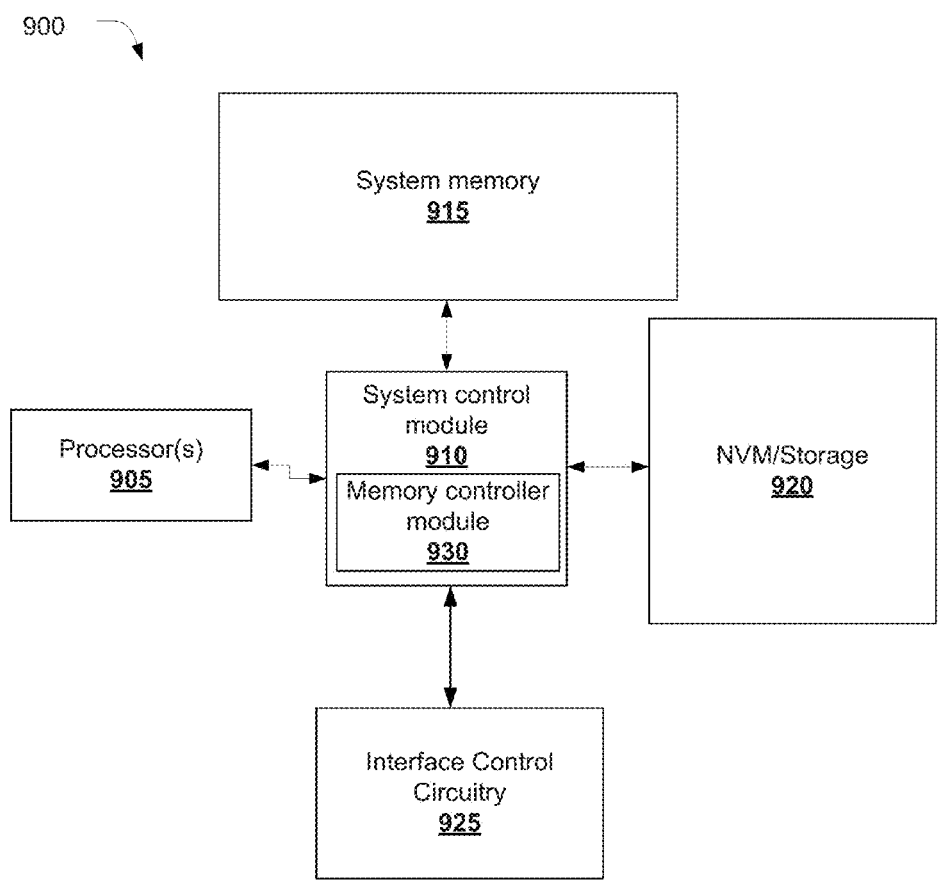
FIG. 9 schematically illustrates an example system that may be used to practice various embodiments described herein.

Embodiments of the present disclosure may be implemented into a system using any suitable hardware and/or software to configure as desired. FIG. 9 schematically illustrates an example system 900 that may be used to practice various embodiments described herein. FIG. 9 illustrates, for one embodiment, an example system 900 having one or more processor(s) 905, system control module 910 coupled to at least one of the processor(s) 905, system memory 915 coupled to system control module 910, non-volatile memory (NVM)/storage 920 coupled to system control module 910, and interface control circuitry 925 coupled to system control module 910.

In some embodiments, the system 900 may be capable of functioning as the UEs 110, 201, or 202 as described herein. In other embodiments, the system 900 may be capable of functioning as eNBs 105 or 205 as described herein. In some embodiments, the system 900 may include one or more computer-readable media (e.g., system memory 915 or NVM/storage 920) having instructions and one or more processors (e.g., processor(s) 905) coupled with the one or more computer-readable media and configured to execute the instructions to implement a module to perform actions described herein.

System control module 910 for one embodiment may include any suitable interface controllers to provide for any suitable interface to at least one of the processor(s) 905 and/or to any suitable device or component in communication with system control module 910.

System control module 910 may include memory controller module 930 to provide an interface to system memory 915. The memory controller module 930 may be a hardware module, a software module, and/or a firmware module.

System memory 915 may be used to load and store data and/or instructions, for example, for system 900. System memory 915 for one embodiment may include any suitable volatile memory, such as suitable dynamic random access memory (DRAM), for example. In some embodiments, the system memory 915 may include double data rate type four synchronous dynamic random-access memory (DDR4 SDRAM).

System control module 910 for one embodiment may include one or more input/output (I/O) controller(s) to provide an interface to NVM/storage 920 and interface control circuitry 925.

The NVM/storage 920 may be used to store data and/or instructions, for example. NVM/storage 920 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 920 may include a storage resource physically part of a device on which the system 900 may be installed or it may be accessible by, but not necessarily a part of, the device. For example, the NVM/storage 920 may be accessed over a network via the interface control circuitry 925.

Interface control circuitry 925 may provide an interface for system 900 to communicate over one or more network(s) and/or with any other suitable device. The system 900 may wirelessly communicate with the one or more components of the wireless network in accordance with any of one or more wireless network standards and/or protocols. In some embodiments the interface control circuitry 925 may include the transceiver modules 130 or 150. In some embodiments, the interface control circuitry 925 may be coupled with the D2D circuitry 120 of FIG. 1, for example the interface control circuitry 925 and the D2D circuitry 120 may be integrated on the same die to form a System on Chip (SoC) (not shown). Specifically, the interface control circuitry 925 may be configured to transmit and/or receive, or facilitate the transmission and/or reception, of one or more signals discussed herein. In some embodiments, the interface control circuitry 925 may be configured to encode and/or decode the signals prior to or subsequent to the transmission and/or reception of the signals.

For one embodiment, at least one of the processor(s) 905 may be packaged together with logic for one or more controller(s) of system control module 910, e.g., memory controller module 930. For one embodiment, at least one of the processor(s) 905 may be packaged together with logic for one or more controllers of system control module 910 to form a System in Package (SiP). For one embodiment, at least one of the processor(s) 905 may be integrated on the same die with logic for one or more controller(s) of system control module 910. For one embodiment, at least one of the processor(s) 905 may be integrated on the same die with logic for one or more controller(s) of system control module 910 to form a SoC.

In some embodiments the processor(s) 905 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or global positioning satellite (GPS) circuitry (not shown).

In various embodiments, the system 900 may be, but is not limited to, a server, a workstation, a desktop computing device, or a mobile computing device (e.g., a laptop computing device, a handheld computing device, a tablet, a netbook, a smartphone, a gaming console, etc.). In various embodiments, the system 900 may have more or fewer components, and/or different architectures. For example, in some embodiments, the system 900 includes one or more of a camera, a keyboard, liquid crystal display (LCD) screen (including touch screen displays), non-volatile memory port, multiple antennas, graphics chip, application-specific integrated circuit (ASIC), and speakers.

Figure 11:
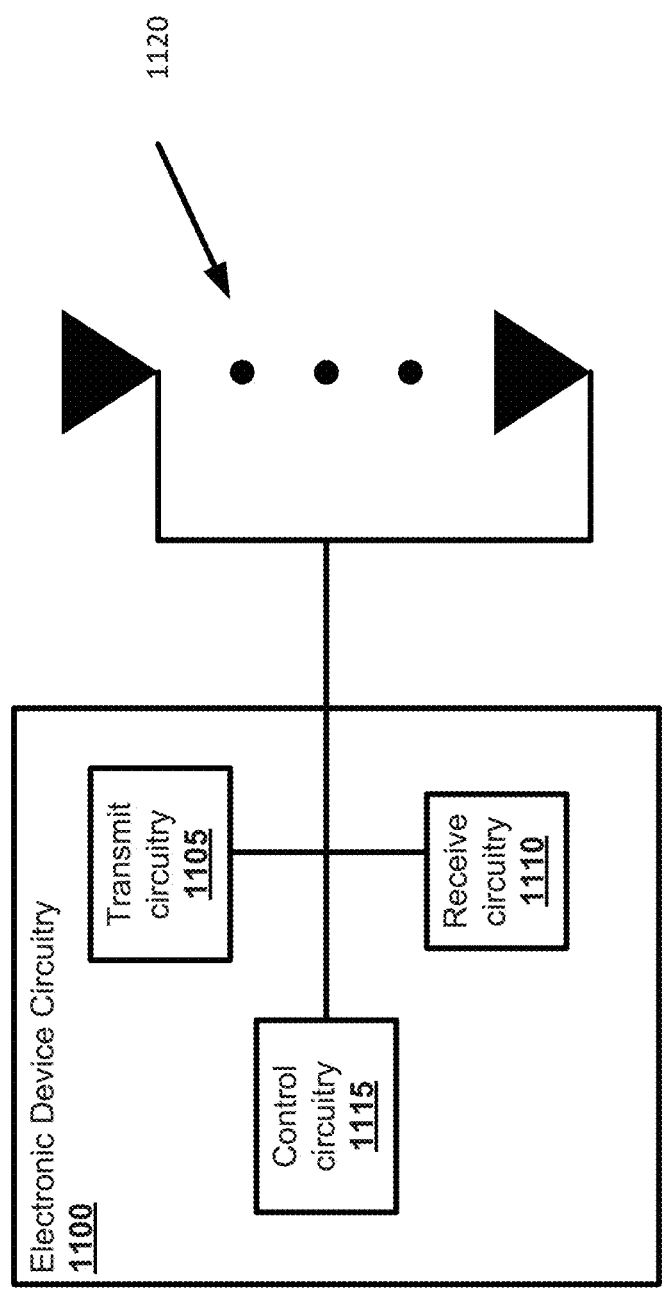
FIG. 11 illustrates example electronic device circuitry, in accordance with various embodiments.

FIG. 11 illustrates electronic device circuitry 1100 that may be eNB circuitry, UE circuitry, or some other type of circuitry in accordance with various embodiments. In embodiments, the electronic device circuitry 1100 may include radio transmit circuitry 1105 and receive circuitry 1110 coupled to control circuitry 1115. In embodiments, the transmit circuitry 1105 and/or receive circuitry 1110 may be elements or modules of transceiver circuitry (not shown). The electronic device circuitry 1100 may be coupled with one or more plurality of antenna elements of one or more antennas 1120. The electronic device circuitry 1100 and/or the components of the electronic device circuitry 1100 may be configured to perform operations similar to those described elsewhere in this disclosure.

As used herein, the term "circuitry" may refer to, be part of, or include an ASIC, an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

Figure 12:
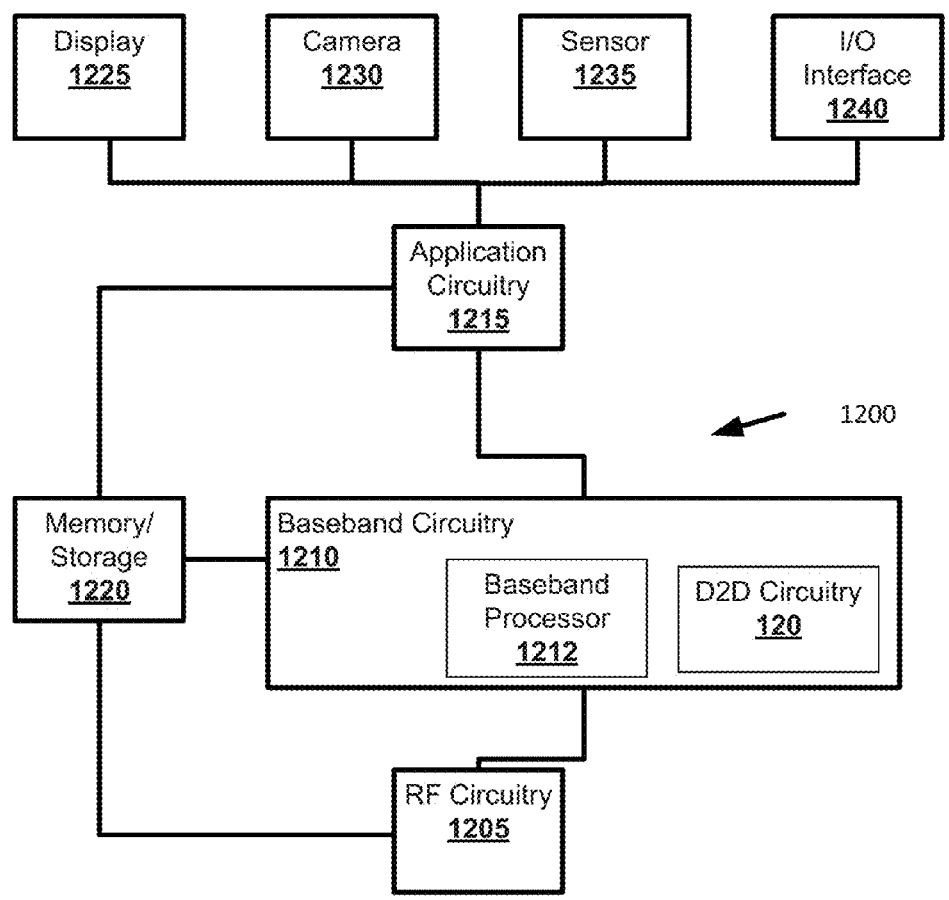
FIG. 12 illustrates an example system, in accordance with various embodiments.

Embodiments described herein may be implemented into a system using any suitably configured hardware and/or software. FIG. 12 illustrates, for one embodiment, an example system 1200 comprising radio frequency (RF) circuitry 1205, baseband circuitry 1210, application circuitry 1215, memory/storage 1220, display 1225, camera 1230, sensor 1235, and input/output (I/O) interface 1240, coupled with each other at least as shown.

The application circuitry 1215 may include circuitry such as, but not limited to, one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband circuitry 1210 may include circuitry such as, but not limited to, one or more single-core or multi-core processors. The processor(s) may include a baseband processor 1212. In some embodiments, the baseband circuitry 1210 may include the D2D circuitry 120. The baseband circuitry 1210 may handle various radio control functions that enables communication with one or more radio networks via the RF circuitry 1205. The radio control functions may include, but are not limited to, signal modulation, encoding, decoding, radio frequency shifting, etc. In some embodiments, the baseband circuitry 1210 may provide for communication compatible with one or more radio technologies. For example, in some embodiments, the baseband circuitry 1210 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1210 is configured to support radio communications of more than one wireless protocol may be referred to as multi-mode baseband circuitry.

In various embodiments, baseband circuitry 1210 may include circuitry to operate with signals that are not strictly considered as being in a baseband frequency. For example, in some embodiments, baseband circuitry 1210 may include circuitry to operate with signals having an intermediate frequency, which is between a baseband frequency and a radio frequency.

RF circuitry 1205 may enable communication with wireless networks using modulated electromagnetic radiation through a non-solid medium. In various embodiments, the RF circuitry 1205 may include switches, filters, amplifiers, etc. to facilitate the communication with the wireless network.

In various embodiments, RF circuitry 1205 may include circuitry to operate with signals that are not strictly considered as being in a radio frequency. For example, in some embodiments, RF circuitry 1205 may include circuitry to operate with signals having an intermediate frequency, which is between a baseband frequency and a radio frequency.

In various embodiments, the transmit circuitry 1105, control circuitry 1115, and/or receive circuitry 1110 discussed herein with respect to FIG. 11 may be embodied in whole or in part in one or more of the RF circuitry 1205, the baseband circuitry 1210, and/or the application circuitry 1215.

In some embodiments, some or all of the constituent components of the baseband circuitry 1210, the application circuitry 1215, and/or the memory/storage 1220 may be implemented together on a system on a chip (SOC).

Memory/storage 1220 may be used to load and store data and/or instructions, for example, for system. Memory/storage 1220 for one embodiment may include any combination of suitable volatile memory (e.g., dynamic random access memory (DRAM)) and/or non-volatile memory (e.g., Flash memory).

In various embodiments, the I/O interface 1240 may include one or more user interfaces designed to enable user interaction with the system 1200 and/or peripheral component interfaces designed to enable peripheral component interaction with the system 1200. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 1235 may include one or more sensing devices to determine environmental conditions and/or location information related to the system 1200. In some embodiments, the one or more sensing devices may include, but are not limited to, a gyro sensor, an accelerometer, a proximity sensor, an ambient light sensor, and a positioning unit. The positioning unit may also be part of, or interact with, the baseband circuitry 1210 and/or RF circuitry 1205 to communicate with components of a positioning network, e.g., a global positioning system (GPS) satellite.

In various embodiments, the display 1225 may include a display (e.g., a liquid crystal display, a touch screen display, etc.).

In various embodiments, the system 1200 may be a mobile computing device such as, but not limited to, a laptop computing device, a tablet computing device, a netbook, an ultrabook, a smartphone, etc. In various embodiments, system 1200 may have more or less components, and/or different architectures.

EXAMPLES

Example 1 may include a user equipment (UE) comprising: device to device (D2D) circuitry to: identify that a first sidelink transmission by the UE is to be transmitted in a same subframe as a second sidelink transmission by the UE; and identify, based on a type of the first sidelink transmission and a type of the second sidelink transmission, that the UE is to continue to transmit the first sidelink transmission and that the UE is to drop the second sidelink transmission; and interface control circuitry coupled with the D2D circuitry, the interface control circuitry to transmit, based on the identification that the UE is to drop the second sidelink transmission, the first sidelink transmission on the resource.

Example 2 may include the UE of example 1, wherein the D2D circuitry is to identify that the first sidelink transmission by the UE is to be transmitted in the same subframe as the second sidelink transmission based on an identification that the first sidelink transmission is to collide in the time domain with the second sidelink transmission.

Example 3 may include the UE of examples 1 or 2, wherein the first sidelink transmission is a Type 2B D2D discovery transmission, and the second sidelink transmission is a Type 1 D2D discovery transmission.

Example 4 may include the UE of example 3, wherein the D2D circuitry is further to identify, in a message received from an evolved NodeB (eNB), an allocation of resources for the Type 2B D2D discovery transmission.

Example 5 may include the UE of example 3, wherein the D2D circuitry is further to identify that a priority of the Type 2B D2D discovery transmission is higher than a priority of the Type 1 D2D discovery transmission.

Example 6 may include the UE of example 3, wherein the D2D circuitry is further to select one or more physical resources for transmission of the Type 1 D2D discovery transmission.

Example 7 may include the UE of example 3, wherein the first sidelink transmission and the second sidelink transmission are D2D transmissions.

Example 8 may include the UE of examples 1 or 2, further comprising a non-volatile memory (NVM) coupled with the interface control circuitry.

Example 9 may include a processor comprising: device-to-device (D2D) circuitry to: identify that a first sidelink transmission by a user equipment (UE) on a resource of a discovery resource period is to collide in a time domain with a second sidelink transmission by the UE; identify, based on a type of the first sidelink transmission and a type of the second sidelink transmission, that the UE is to continue to transmit the first sidelink transmission and that the UE is to drop the second sidelink transmission; and transmit, based on the identification that the UE is to drop the second sidelink transmission, the first sidelink transmission on the resource; and a baseband processor coupled with the D2D circuitry, the baseband processor to perform signal modulation and encoding.

Example 10 may include the processor of example 9, wherein the discovery resource period is a subframe.

Example 11 may include the processor of examples 9 or 10, wherein the first sidelink transmission is a Type 2B D2D discovery transmission, and the second sidelink transmission is a Type 1 D2D discovery transmission.

Example 12 may include the processor of example 11, wherein the D2D circuitry is further to identify, in a message received from an evolved NodeB (eNB), an allocation of resources for the Type 2B D2D discovery transmission.

Example 13 may include the processor of example 11, wherein the processor is further to identify that a priority of the Type 2B D2D discovery transmission is higher than a priority of the Type 1 D2D discovery transmission.

Example 14 may include the processor of example 11, wherein the processor is further to select one or more physical resources for transmission of the Type 1 D2D discovery transmission.

Example 15 may include the processor of example 11, wherein the first sidelink transmission and the second sidelink transmission are D2D transmissions.

Example 16 may include one or more non-transitory computer-readable media comprising instructions to cause a user equipment (UE), upon execution of the instructions by one or more processors of the UE, to: identify that a first sidelink transmission by the UE on a resource of a discovery resource period is to collide in a time domain with a second sidelink transmission by the UE; identify, based on a type of the first sidelink transmission and a type of the second sidelink transmission, that the UE is to continue to transmit the first sidelink transmission and that the UE is to drop the second sidelink transmission; and transmit, based on the identification that the UE is to drop the second sidelink transmission, the first sidelink transmission on the resource.

Example 17 may include the one or more non-transitory computer-readable media of example 16, wherein the discovery resource period is a subframe.

Example 18 may include the one or more non-transitory computer-readable media of examples 16 or 17, wherein the first sidelink transmission is a Type 2B device-to-device (D2D) discovery transmission, and the second sidelink transmission is a Type 1 D2D discovery transmission.

Example 19 may include the one or more non-transitory computer-readable media of example 18, wherein the instructions are further to identify, in a message received from an evolved NodeB (eNB), an allocation of resources for the Type 2B D2D discovery transmission.

Example 20 may include the one or more non-transitory computer-readable media of example 18, wherein the instructions are further to identify that a priority of the Type 2B D2D discovery transmission is higher than a priority of the Type 1 D2D discovery transmission.

Example 21 may include the one or more non-transitory computer-readable media of example 18, wherein the instructions are further to select one or more physical resources for transmission of the Type 1 D2D discovery transmission.

Example 22 may include the one or more non-transitory computer-readable media of example 18, wherein the first sidelink transmission and the second sidelink transmission are D2D transmissions.

Example 23 may include a user equipment (UE) comprising: means to identify that a first sidelink transmission by the UE on a resource of a discovery resource period is to collide in a time domain with a second sidelink transmission by the UE; means to identify, based on a type of the first sidelink transmission and a type of the second sidelink transmission, that the UE is to continue to transmit the first sidelink transmission and that the UE is to drop the second sidelink transmission; and means to transmit, based on the identification that the UE is to drop the second sidelink transmission, the first sidelink transmission on the resource.

Example 24 may include the UE of example 23, wherein the discovery resource period is a subframe.

Example 25 may include the UE of examples 23 or 24, wherein the first sidelink transmission is a Type 2B device-to-device (D2D) discovery transmission, and the second sidelink transmission is a Type 1 D2D discovery transmission.

Example 26 may include the UE of example 25, wherein the instructions are further to identify, in a message received from an evolved NodeB (eNB), an allocation of resources for the Type 2B D2D discovery transmission.

Example 27 may include the UE of example 25, wherein the instructions are further to identify that a priority of the Type 2B D2D discovery transmission is higher than a priority of the Type 1 D2D discovery transmission.

Example 28 may include the UE of example 25, wherein the instructions are further to select one or more physical resources for transmission of the Type 1 D2D discovery transmission.

Example 29 may include the UE of example 25, wherein the first sidelink transmission and the second sidelink transmission are D2D transmissions.

Example 30 may include a method comprising: identifying, by a user equipment (UE), that a first sidelink transmission by the UE on a resource of a discovery resource period is to collide in a time domain with a second sidelink transmission by the UE; identifying, by the UE based on a type of the first sidelink transmission and a type of the second sidelink transmission, that the UE is to continue to transmit the first sidelink transmission and that the UE is to drop the second sidelink transmission; and transmitting, by the UE based on the identification that the UE is to drop the second sidelink transmission, the first sidelink transmission on the resource.

Example 31 may include the method of example 30, wherein the discovery resource period is a subframe.

Example 32 may include the method of examples 30 or 31, wherein the first sidelink transmission is a Type 2B device-to-device (D2D) discovery transmission, and the second sidelink transmission is a Type 1 D2D discovery transmission.

Example 33 may include the method of example 32, further comprising identifying, by the UE in a message received from an evolved NodeB (eNB), an allocation of resources for the Type 2B D2D discovery transmission.

Example 34 may include the method of example 32, further comprising identifying, by the UE, that a priority of the Type 2B D2D discovery transmission is higher than a priority of the Type 1 D2D discovery transmission.

Example 35 may include the method of example 32, further comprising selecting, by the UE, one or more physical resources for transmission of the Type 1 D2D discovery transmission.

Example 36 may include the method of example 32, wherein the first sidelink transmission and the second sidelink transmission are D2D transmissions.

Example 37 may include a user equipment (UE) comprising: device-to-device (D2D) circuitry to: identify a time resource pattern for transmissions (T-RPT) that includes a scheduling assignment (SA) period with one or more transmission opportunity bundles (TOBs) that respectively include a plurality of transmission time intervals (TTIs) that are to be used for D2D transmission by the UE; map a medium access control (MAC) protocol data unit (PDU) to one or more TTIs of a first TOB of the one or more TOBs; and identify, based on the mapping, a second TOB of the one or more TOBs with unmapped TTIs; and transmit circuitry coupled with the D2D circuitry, the transmit circuitry to: transmit the MAC PDU via the first TOB; and skip transmission on the second TOB.

Example 38 may include the UE of example 37, wherein the UE is to operate according to Mode-1 operation wherein an evolved NodeB (eNB) is to allocate resources for the T-RPT.

Example 39 may include the UE of example 38, further comprising: receive circuitry coupled with the transmit circuitry, the receive circuitry to receive an indication of the T-RPT from the eNB.

Example 40 may include the UE of example 39, wherein the MAC PDU is a first MAC PDU and the SA period is a first SA period, and wherein the D2D circuitry is further to: identify, after the skipping, a second MAC PDU; and map the second MAC PDU to one or more TTIs of a TOB of a second SA period that follows the first SA period.

Example 41 may include the UE of example 37, wherein the UE is to operate according to Mode-2 operation such that the D2D circuitry is further to allocate resources for the T-RPT.

Example 42 may include the UE of example 41, wherein the MAC PDU is a first MAC PDU, and wherein the D2D circuitry is further to: identify a second MAC PDU; and map the second MAC PDU to a third TOB of the one or more TOBs, wherein the third TOB does not immediately follow the first TOB in the SA period.

Example 43 may include the UE of any of examples 37-42, further comprising a display coupled with the D2D circuitry.

Example 44 may include a method comprising: identifying, by a user equipment (UE), a time resource pattern for transmissions (T-RPT) that includes a scheduling assignment (SA) period with one or more transmission opportunity bundles (TOBs) that respectively include a plurality of transmission time intervals (TTIs) that are to be used for device-to-device (D2D) transmission by the UE; mapping, by the UE, a medium access control (MAC) protocol data unit (PDU) to one or more TTIs of a first TOB of the one or more TOBs; identifying, by the UE based on the mapping, a second TOB of the one or more TOBs with unmapped TTIs; transmitting, by the UE, the MAC PDU via the first TOB; and skipping, by the UE, transmission on the second TOB.

Example 45 may include the method of example 44, wherein the UE is to operate according to Mode-1 operation wherein an evolved NodeB (eNB) is to allocate resources for the T-RPT.

Example 46 may include the method of example 45, further comprising receiving, by the UE, an indication of the T-RPT from the eNB.

Example 47 may include the method of example 46, wherein the MAC PDU is a first MAC PDU and the SA period is a first SA period, and further comprising: identifying, by the UE after the skipping, a second MAC PDU; and mapping, by the UE, the second MAC PDU to one or more TTIs of a TOB of a second SA period that follows the first SA period.

Example 48 may include the method of example 44, wherein the UE is to operate according to Mode-2 operation and the method further comprises allocating, by the UE, resources for the T-RPT.

Example 49 may include the method of example 48, wherein the MAC PDU is a first MAC PDU, and further comprising: identifying, by the UE, a second MAC PDU; and mapping, by the UE, the second MAC PDU to a third TOB of the one or more TOBs, wherein the third TOB does not immediately follow the first TOB in the SA period.

Example 50 may include a user equipment (UE) comprising: means to identify a time resource pattern for transmissions (T-RPT) that includes a scheduling assignment (SA) period with one or more transmission opportunity bundles (TOBs) that respectively include a plurality of transmission time intervals (TTIs) that are to be used for device-to-device (D2D) transmission by the UE; means to map a medium access control (MAC) protocol data unit (PDU) to one or more TTIs of a first TOB of the one or more TOBs; means to identify, based on the mapping, a second TOB of the one or more TOBs with unmapped TTIs; means to transmit the MAC PDU via the first TOB; and means to skip transmission on the second TOB.

Example 51 may include the UE of example 50, wherein the UE is to operate according to Mode-1 operation wherein an evolved NodeB (eNB) is to allocate resources for the T-RPT.

Example 52 may include the UE of example 51, further comprising means to receive an indication of the T-RPT from the eNB.

Example 53 may include the UE of example 52, wherein the MAC PDU is a first MAC PDU and the SA period is a first SA period, and further comprising: means to identify, after the skipping, a second MAC PDU; and means to map the second MAC PDU to one or more TTIs of a TOB of a second SA period that follows the first SA period.

Example 54 may include the UE of example 50, wherein the UE is to operate according to Mode-2 operation and further comprising means to allocate resources for the T-RPT.

Example 55 may include the UE of example 54, wherein the MAC PDU is a first MAC PDU, and further comprising: means to identify a second MAC PDU; and means to map the second MAC PDU to a third TOB of the one or more TOBs, wherein the third TOB does not immediately follow the first TOB in the SA period.

Example 56 may include one or more non-transitory computer-readable media comprising instructions to cause a user equipment (UE), upon execution of the instructions by a processor of the UE, to: identify a time resource pattern for transmissions (T-RPT) that includes a scheduling assignment (SA) period with one or more transmission opportunity bundles (TOBs) that respectively include a plurality of transmission time intervals (TTIs) that are to be used for device-to-device (D2D) transmission by the UE; map a medium access control (MAC) protocol data unit (PDU) to one or more TTIs of a first TOB of the one or more TOBs; identify, based on the mapping, a second TOB of the one or more TOBs with unmapped TTIs; transmit the MAC PDU via the first TOB; and skip transmission on the second TOB.

Example 57 may include the one or more non-transitory computer-readable media of example 56, wherein the UE is to operate according to Mode-1 operation wherein an evolved NodeB (eNB) is to allocate resources for the T-RPT.

Example 58 may include the one or more non-transitory computer-readable media of example 57, wherein the instructions are further to cause the UE to receive an indication of the T-RPT from the eNB.

Example 59 may include the one or more non-transitory computer-readable media of example 58, wherein the MAC PDU is a first MAC PDU and the SA period is a first SA period, and the instructions are further to cause the UE to: identify, after the skipping, a second MAC PDU; and map the second MAC PDU to one or more TTIs of a TOB of a second SA period that follows the first SA period.

Example 60 may include the one or more non-transitory computer-readable media of example 56, wherein the UE is to operate according to Mode-2 operation and the instructions are further to cause the UE to allocate resources for the T-RPT.

Example 61 may include the UE of example 60, wherein the MAC PDU is a first MAC PDU, and the instructions are further to cause the UE to: identify a second MAC PDU; and map the second MAC PDU to a third TOB of the one or more TOBs, wherein the third TOB does not immediately follow the first TOB in the SA period.

Example 62 may include a method comprising: identifying, by a user equipment (UE), a scheduling assignment (SA) cycle that includes a first portion of transmission time intervals (TTIs) for device-to-device (D2D) transmission of a first SA, a second portion of TTIs for D2D transmission of a second SA, and a third portion of TTIs for D2D transmission of data; identifying, by the UE, a collision of the D2D transmission of the first SA or the second SA with a concurrent transmission; and determining, by the UE based on the collision, whether to transmit the first SA, the second SA, or the data.

Example 63 may include the method of example 62, wherein the first SA and the second SA are identical to one another and include scheduling information related to the third portion of TTIs.

Example 64 may include the method of examples 62 or 63, wherein the collision is a collision of the transmission of the first SA with the concurrent transmission.

Example 65 may include the method of example 64, wherein the UE is to operate according to Mode-1 operation wherein an evolved NodeB (eNB) is to allocate resources for the SA cycle, and wherein determining whether to transmit the first SA, the second SA, or the data includes determining, by the UE, to transmit the second SA and the data.

Example 66 may include the method of examples 62 or 63, wherein the collision is a collision of the transmission of the second SA with the concurrent transmission, and wherein the determining whether to transmit the first SA, the second SA, or the data includes determining, by the UE, to transmit the data.

Example 67 may include the method of examples 62 or 63, wherein the collision is a collision of the transmission of the first SA and the second SA with the concurrent transmission, and wherein the determining whether to transmit the first SA, the second SA, or the data includes determining, by the UE, not to transmit the data.

Example 68 may include a user equipment (UE) comprising: means to identify a scheduling assignment (SA) cycle that includes a first portion of transmission time intervals (TTIs) for device-to-device (D2D) transmission of a first SA, a second portion of TTIs for D2D transmission of a second SA, and a third portion of TTIs for D2D transmission of data; means to identify a collision of the D2D transmission of the first SA or the second SA with a concurrent transmission; and means to determine, based on the collision, whether to transmit the first SA, the second SA, or the data.

Example 69 may include the UE of example 68, wherein the first SA and the second SA are identical to one another and include scheduling information related to the third portion of TTIs.

Example 70 may include the UE of examples 68 or 69, wherein the collision is a collision of the transmission of the first SA with the concurrent transmission.

Example 71 may include the UE of example 70, wherein the UE is to operate according to Mode-1 operation wherein an evolved NodeB (eNB) is to allocate resources for the SA cycle, and wherein the means to determine whether to transmit the first SA, the second SA, or the data include means to determine to transmit the second SA and the data.

Example 72 may include the UE of examples 68 or 69, wherein the collision is a collision of the transmission of the second SA with the concurrent transmission, and wherein the determining whether to transmit the first SA, the second SA, or the data includes determining, by the UE, to transmit the data.

Example 73 may include the UE of examples 68 or 69, wherein the collision is a collision of the transmission of the first SA and the second SA with the concurrent transmission, and wherein the means to determine whether to transmit the first SA, the second SA, or the data include means to determine not to transmit the data.

Example 74 may include one or more non-transitory computer-readable media comprising instructions to cause a user equipment (UE), upon execution of the instructions by one or more processors of the UE, to identify a scheduling assignment (SA) cycle that includes a first portion of transmission time intervals (TTIs) for device-to-device (D2D) transmission of a first SA, a second portion of TTIs for D2D transmission of a second SA, and a third portion of TTIs for D2D transmission of data; identify a collision of the D2D transmission of the first SA or the second SA with a concurrent transmission; and determine, based on the collision, whether to transmit the first SA, the second SA, or the data.

Example 75 may include the one or more non-transitory computer-readable media of example 74, wherein the first SA and the second SA are identical to one another and include scheduling information related to the third portion of TTIs.

Example 76 may include the one or more non-transitory computer-readable media of examples 74 or 75, wherein the collision is a collision of the transmission of the first SA with the concurrent transmission.

Example 77 may include the one or more non-transitory computer-readable media of example 76, wherein the UE is to operate according to Mode-1 operation wherein an evolved NodeB (eNB) is to allocate resources for the SA cycle, and the instructions to cause the UE to determine whether to transmit the first SA, the second SA, or the data include instructions to cause the UE to determine to transmit the second SA and the data.

Example 78 may include the one or more non-transitory computer-readable media of examples 74 or 75, wherein the collision is a collision of the transmission of the second SA with the concurrent transmission, and wherein the instructions to cause the UE to determine whether to transmit the first SA, the second SA, or the data include instructions to cause the UE to determine to transmit the data.

Example 79 may include the one or more non-transitory computer-readable media of examples 74 or 75, wherein the collision is a collision of the transmission of the first SA and the second SA with the concurrent transmission, and wherein the instructions to cause the UE to determine whether to transmit the first SA, the second SA, or the data include instructions to cause the UE to determine not to transmit the data.

Example 80 may include a user equipment (UE) comprising: device-to-device (D2D) circuitry to: identify a scheduling assignment (SA) cycle that includes a first portion of transmission time intervals (TTIs) for device-to-device (D2D) transmission of a first SA, a second portion of TTIs for D2D transmission of a second SA, and a third portion of TTIs for D2D transmission of data; identify a collision of the D2D transmission of the first SA or the second SA with a concurrent transmission; and determine, UE based on the collision, whether to transmit the first SA, the second SA, or the data; and interface control circuitry coupled with the D2D circuitry, the interface control circuitry to transmit the first SA, the second SA, or the data.

Example 81 may include the UE of example 80, wherein the first SA and the second SA are identical to one another and include scheduling information related to the third portion of TTIs.

Example 82 may include the UE of examples 80 or 81, wherein the collision is a collision of the transmission of the first SA with the concurrent transmission.

Example 83 may include the UE of example 82, wherein the UE is to operate according to Mode-1 operation wherein an evolved NodeB (eNB) is to allocate resources for the SA cycle, and wherein the D2D circuitry is to determine to transmit the second SA and the data.

Example 84 may include the UE of examples 80 or 81, wherein the collision is a collision of the transmission of the second SA with the concurrent transmission, and wherein the D2D circuitry is to determine to transmit the data.

Example 85 may include the UE of examples 80 or 81, wherein the collision is a collision of the transmission of the first SA and the second SA with the concurrent transmission, and wherein the D2D circuitry is to determine not to transmit the data.

Example 86 may include a method for a User Equipment (UE) to transmit Device-to-Device (D2D or Sidelink) data comprising of: handling, by the UE, of Scheduling Assignment (SA or Physical Sidelink Control Channel (PSCCH)) transmission collision with more prioritized operation; handling, by the UE, of D2D data transmission with more prioritized operation; handling, by the UE, of MAC Packet Data Unit (PDU) transmission inside allocated spectrum resources; and handling, by the UE, of D2D discovery transmission collision with more prioritized operation.

Example 87 may include the method of example 86, wherein a Transmission Opportunity Bundle (TOB) is 4 consecutive transmission opportunities within time resource pattern for transmissions (T-RPT) where the starting transmission opportunity index is multiple of 4 (e.g. 0, 4, 8 . . . ).

Example 88 may include the method of example 87, wherein the UE handles a situation of empty data buffer during an SA period in Mode-1 (evolved NodeB (eNB) controlled mode) D2D operation.

Example 89 may include the method of example 88, wherein the UE transmits padding bits in the remaining allocated resources in case it has no data in the buffer.

Example 90 may include the method of example 88, wherein the UE retransmits already transmitted MAC PDU (s) in the remaining allocated resources in case it has no data in the buffer.

Example 91 may include the method of example 88, wherein the UE stops transmission in the remaining allocated resources in case it has no data in the buffer.

Example 92 may include the method of example 87, wherein the UE handles MAC PDU transmission currently in the buffer when operating in autonomous resource allocation mode (Mode-2).

Example 93 may include the method of example 92, wherein the UE transmits MAC PDU in the nearest allocated TOB when MAC PDU arrives to the buffer.

Example 94 may include the method of example 92, wherein the UE stops transmission in a given SA period if it has no data in the buffer.

Example 95 may include the method of example 92, wherein the UE decides about a TOB for a given MAC PDU transmission taking into account its latency budget and the resources remained in SA period.

Example 96 may include the method of example 95, wherein the UE is not mandated to stop transmission in a given SA period if it has empty buffer.

Example 97 may include the method of example 87, wherein an SA transmission comprised of 2 instances collides with more prioritized operation.

Example 98 may include the method of example 97, wherein an eNB allocates the collided SA instances.

Example 99 may include the method of example 98, wherein the first SA instance collides with more prioritized operation and the UE does not transmit the second instance of SA and the corresponding data.

Example 100 may include the method of example 98, wherein the first SA instance collides with more prioritized operation and the UE transmits the second instance of SA and the corresponding data.

Example 101 may include the method of example 97, wherein the UE selected the collided SA instances.

Example 102 may include the method of example 101, wherein the first SA instance collides with more prioritized operation and the UE does not transmit the second instance of SA and the corresponding data.

Example 103 may include the method of example 101, wherein the first SA instance collides with more prioritized operation and the UE transmits the second instance of SA and the corresponding data.

Example 104 may include the method of example 101, wherein the first SA instance collides with more prioritized operation and the UE decides to transmit the second instance of SA and the corresponding data if it has no latency budget to drop transmission and restart it in the next SA period.

Example 105 may include the method of example 98, wherein the second SA instance collides with more prioritized operation and the UE does not transmit the corresponding data.

Example 106 may include the method of example 98, wherein the second SA instance collides with more prioritized operation and the UE transmits the corresponding data.

Example 107 may include the method of example 101, wherein the second SA instance collides with more prioritized operation and the UE does not transmit the corresponding data.

Example 108 may include the method of example 101, wherein the second SA instance collides with more prioritized operation and the UE transmits the corresponding data.

Example 109 may include the method of example 87, wherein a data transmission comprised of 4 instances collided with more prioritized operation on the current TOB.

Example 110 may include the method of example 109, wherein an eNB allocated the collided data instances.

Example 111 may include the method of example 110, wherein any one or more instances of a data transmission collide with more prioritized operation.

Example 112 may include the method of example 111, wherein the UE decides to transmit non-collided data instances and retransmit all 4 data instances on the next TOB.

Example 113 may include the method of example 111, wherein the UE decides to transmit non-collided data instances and not retransmit the collided data instances on the next TOB.

Example 114 may include the method of example 111, wherein the UE decides to not transmit the remaining non-collided data instances on the current TOB and retransmit all 4 data instances on the next TOB.

Example 115 may include the method of example 111, wherein the UE decides to not transmit the remaining non-collided data instances on the current TOB and not retransmit all 4 data instances on the next TOB.

Example 116 may include the method of example 109, wherein the UE allocates himself the collided data instances.

Example 117 may include the method of example 116, wherein any one or more instances of a data transmission collide with more prioritized operation.

Example 118 may include the method of example 117, wherein the UE decides to transmit non-collided data instances and retransmit all 4 data instances on the next TOB.

Example 119 may include the method of example 117, wherein the UE decides to transmit non-collided data instances and not retransmit the collided data instances on the next TOB.

Example 120 may include the method of example 117, wherein the UE decides to not transmit the remaining non-collided data instances on the current TOB and retransmit all 4 data instances on the next TOB.

Example 121 may include the method of example 117, wherein the UE decides to not transmit the remaining non-collided data instances on the current TOB and not retransmit all 4 data instances on the next TOB.

Example 122 may include the method of example 86, at the D2D discovery transmitting (Tx) UE, wherein the discovery message transmission within a discovery period comprises of an initial and one or more repeated transmissions, and at least one of the initial or repeated transmissions within the discovery period collides in time-domain from the Tx UE's perspective with another higher priority WAN or D2D channel/signal.

Example 123 may include the method of example 122, at the D2D discovery Tx UE, wherein a Type 2B discovery message transmission instance has a time-domain conflict with a Type 1 discovery message transmission, and the Type 2B discovery message transmission is prioritized and Type 1 discovery transmission is dropped.

Example 124 may include the method of example 122, at the D2D discovery Tx UE, wherein a Type 1 discovery transmission has a time-domain conflict with another higher priority WAN or D2D signal or channel and at least one of the initial or repeated transmissions within the discovery period is dropped.

Example 125 may include the method of example 124, at the D2D discovery Tx UE, wherein the Tx UE continues Type 1 discovery message transmission according to the specified redundancy version order on the other subframes irrespective of whether one or a plurality of the transmissions (possibly including the initial transmission) is/are dropped.

Example 126 may include the method of example 122, at the D2D discovery Tx UE, wherein a Type 2B discovery transmission has a time-domain conflict with another higher priority WAN or D2D signal or channel and at least one of the initial or repeated transmissions within the discovery period is dropped.

Example 127 may include the method of example 126, at the D2D discovery Tx UE, wherein the Tx UE continues Type 2B discovery message transmission according to the specified redundancy version order on the other subframes irrespective of whether one or a plurality of the transmissions (possibly including the initial transmission) is/are dropped.

Example 128 may include an apparatus comprising means to perform the method of any of examples 86-127.

Example 129 may include one or more non-transitory computer-readable media comprising instructions to cause an electronic device, upon execution of the instructions by one or more processors of the electronic device, to perform the method of any of examples 86-127.

Example 130 may include an electronic device comprising receive circuitry, transmit circuitry, and/or control circuitry to perform one or more elements of the method of any of examples 86-127.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A user equipment (UE) comprising:
device-to-device (D2D) circuitry to:
identify that a first sidelink transmission by the UE is to be transmitted in a same subframe as a second sidelink transmission by the UE; and
identify, based on a type of the first sidelink transmission and a type of the second sidelink transmission, that the UE is to continue to transmit the first sidelink transmission and that the UE is to drop the second sidelink transmission; and
interface control circuitry coupled with the D2D circuitry, the interface control circuitry to transmit, based on the identification that the UE is to drop the second sidelink transmission, the first sidelink transmission on the subframe;
wherein the first sidelink transmission is a Type 2B D2D discovery transmission, and the second sidelink transmission is a Type 1 D2D discovery transmission.

2. The UE of claim 1, wherein the D2D circuitry is to identify that the first sidelink transmission by the UE is to be transmitted in the same subframe as the second sidelink transmission based on an identification that the first sidelink transmission is to collide in a time domain as the second sidelink transmission.

3. The UE of claim 1, wherein the D2D circuitry is further to identify, in a message received from an evolved NodeB (eNB), an allocation of resources for the Type 2B D2D discovery transmission.

4. The UE of claim 1, wherein the D2D circuitry is further to identify that a priority of the Type 2B D2D discovery transmission is higher than a priority of the Type 1 D2D discovery transmission.

5. The UE of claim 1, wherein the D2D circuitry is further to select one or more physical resources for transmission of the Type 1 D2D discovery transmission.

6. The UE of claim 1, wherein the first sidelink transmission and the second sidelink transmission are D2D transmissions.

7. The UE of claim 1, further comprising a non-volatile memory (NVM) coupled with the interface control circuitry.

8. A processor comprising:
device-to-device (D2D) circuitry to:
identify that a first sidelink transmission by a user equipment (UE) on a resource of a discovery resource period is to collide in a time domain with a second sidelink transmission by the UE;
identify, based on a type of the first sidelink transmission and a type of the second sidelink transmission, that the UE is to continue to transmit the first sidelink transmission and that the UE is to drop the second sidelink transmission; and
transmit, based on the identification that the UE is to drop the second sidelink transmission, the first sidelink transmission on the resource; and
a baseband processor coupled with the D2D circuitry, the baseband processor to perform signal modulation and encoding;
wherein the first sidelink transmission is a Type 2B D2D discovery transmission, and the second sidelink transmission is a Type 1 D2D discovery transmission.

9. The processor of claim 8, wherein the discovery resource period is a subframe.

10. The processor of claim 8, wherein the D2D circuitry is further to identify, in a message received from an evolved NodeB (eNB), an allocation of resources for the Type 2B D2D discovery transmission.

11. The processor of claim 8, wherein the processor is further to identify that a priority of the Type 2B D2D discovery transmission is higher than a priority of the Type 1 D2D discovery transmission.

12. The processor of claim 8, wherein the processor is further to select one or more physical resources for transmission of the Type 1 D2D discovery transmission.

13. The processor of claim 8, wherein the first sidelink transmission and the second sidelink transmission are D2D transmissions.

14. One or more non-transitory computer-readable media comprising instructions to cause a user equipment (UE), upon execution of the instructions by one or more processors of the UE, to:
identify that a first sidelink transmission by the UE on a resource of a discovery resource period is to collide in a time domain with a second sidelink transmission by the UE;
identify, based on a type of the first sidelink transmission and a type of the second sidelink transmission, that the UE is to continue to transmit the first sidelink transmission and that the UE is to drop the second sidelink transmission; and
transmit, based on the identification that the UE is to drop the second sidelink transmission, the first sidelink transmission on the resource;
wherein the first sidelink transmission is a Type 2B device-to-device (D2D) discovery transmission, and the second sidelink transmission is a Type 1 D2D discovery transmission.

15. The one or more non-transitory computer-readable media of claim 14, wherein the discovery resource period is a subframe.

16. The one or more non-transitory computer-readable media of claim 14, wherein the instructions are further to identify, in a message received from an evolved NodeB (eNB), an allocation of resources for the Type 2B D2D discovery transmission.

17. The one or more non-transitory computer-readable media of claim 14, wherein the instructions are further to identify that a priority of the Type 2B D2D discovery transmission is higher than a priority of the Type 1 D2D discovery transmission.

18. The one or more non-transitory computer-readable media of claim 14, wherein the instructions are further to select one or more physical resources for transmission of the Type 1 D2D discovery transmission.

19. The one or more non-transitory computer-readable media of claim 14, wherein the first sidelink transmission and the second sidelink transmission are D2D transmissions.

* * * * *